Nov. 7, 1967 T. I. SORENSON ET AL 3,351,236

WEIGHING DEVICE WITH ELECTRONIC COMPUTER

Filed March 19, 1963 10 Sheets-Sheet 1

INVENTORS
THEODORE I. SORENSON
FOLKEC. SHOVIC
BY Kimmel & Crowell
ATTORNEYS.

WEIGHING DEVICE WITH ELECTRONIC COMPUTER

Filed March 19, 1963 10 Sheets-Sheet 2

INVENTORS
THEODORE I. SORENSON
BY FOLKE C. SHOVIC
Kimmel & Crowell
ATTORNEYS.

INVENTORS
THEODORE I. SORENSON
FOLKE C. SHOVIC
BY Kimmel & Crowell
ATTORNEYS.

INVENTORS
THEODORE I. SORENSON
BY FOLKE C. SHOVIC
Kimmel & Crowell
ATTORNEYS.

Nov. 7, 1967 T. I. SORENSON ET AL 3,351,236

WEIGHING DEVICE WITH ELECTRONIC COMPUTER

Filed March 19, 1963 10 Sheets-Sheet 5

INVENTORS
THEODORE I. SORENSON
BY FOLKE C. SHOVIC
Kimmel & Crowell
ATTORNEYS.

INVENTORS
THEODORE I. SORENSON
BY FOLKE C. SHOVIC
Kimmel & Crowell
ATTORNEYS.

INVENTORS
THEODORE I. SORENSON
BY FOLKE C. SHOVIC
Kimmel & Crowell
ATTORNEYS.

INVENTORS
THEODORE I. SORENSON
FOLKE C. SHOVIC
BY Kimmel & Crowell
ATTORNEYS.

INVENTORS
THEODORE I. SORENSON
BY FOLKE C. SKOVIC
Kimmel & Crowell
ATTORNEYS.

INVENTORS
THEODORE I. SORENSON
BY FOLKE C. SHOVIC
Kimmel & Crowell
ATTORNEYS.

United States Patent Office 3,351,236

Patented Nov. 7, 1967

3,351,236

WEIGHING DEVICE WITH ELECTRONIC COMPUTER

Theodore I. Sorenson, Dutton, Mont. 59433, and Folke C. Shovic, 3644 9th Ave. S., Great Falls, Mont. 59401

Filed Mar. 19, 1963, Ser. No. 266,321
21 Claims. (Cl. 222—20)

This invention relates to an electronic computer for determining the weight to volume ratio of liquids and flowable solids, such as grain, pulverized coal, gravel, and sand.

The object of the present invention is to provide a computer which is responsive to variable input stimuli, such as the volume and rate of flow of the material and which will combine these various input stimuli and transfer same into a linear output signal.

Another object of the present invention is to provide an electronic computer which will translate flow information, stationary weight information and general pressure information from their analog or status form to a true and readily perceptible form and one from which valid conclusions can be drawn.

A further object of the present invention is to provide an electronic computer which is responsive to variable input signals produced by the volume and rate of flow of the liquids or flowable solids and which has as its output or terminal component a tally unit for developing a readable signal when any predetermined quantity or preset number of units of the material has passed the transducers in the input stage.

Still another object of the present invention is to provide an electronic computer which, while primarily intended for determining the volume and rate of flow of liquids and flowable solids during movement of the latter, can also be used for determining the weights of the liquids and flowable solids in the stationary condition through the use of a backwards circuit, which circuit utilizes the anode of an electronic release device as the input.

An additional object of the present invention is to provide an electronic computer which has an infinite range of rate changes through its ability to readily and simply change response curves from the nonlinear to straight linear forms.

It is also an object of the present invention to provide an electronic computer for use in conjunction with a continuous weighing system, which combines a high degree of accuracy and a rapid speed of response.

Still other objects, advantages, and improvements will become apparent from the following specification, taken in connection with the accompanying drawings, in which.

Figures 8, 8A:
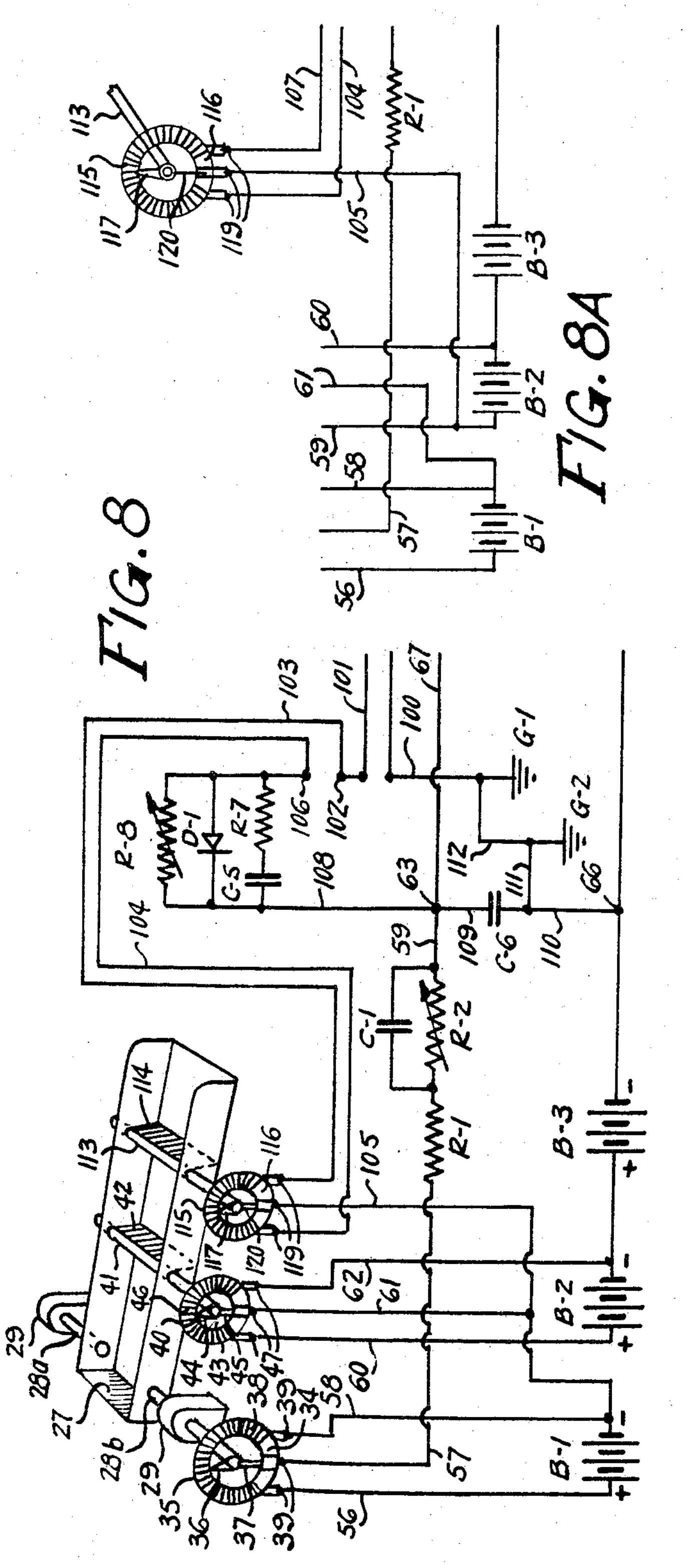
FIGURE 8 is a partial circuit diagram, showing an additional transducer in the circuit.
Figures 18, 19, 20, 21:
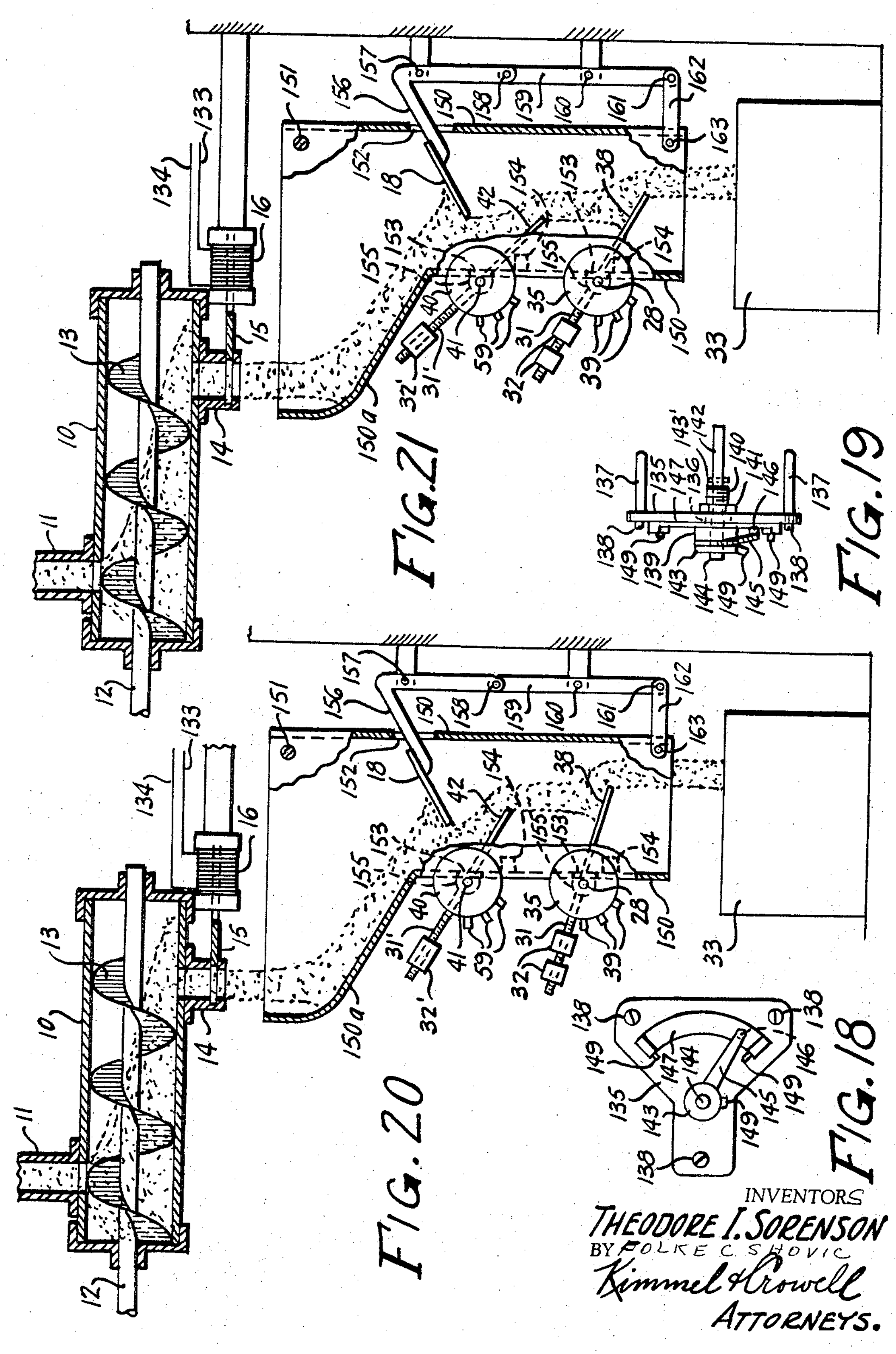
Figure 22:
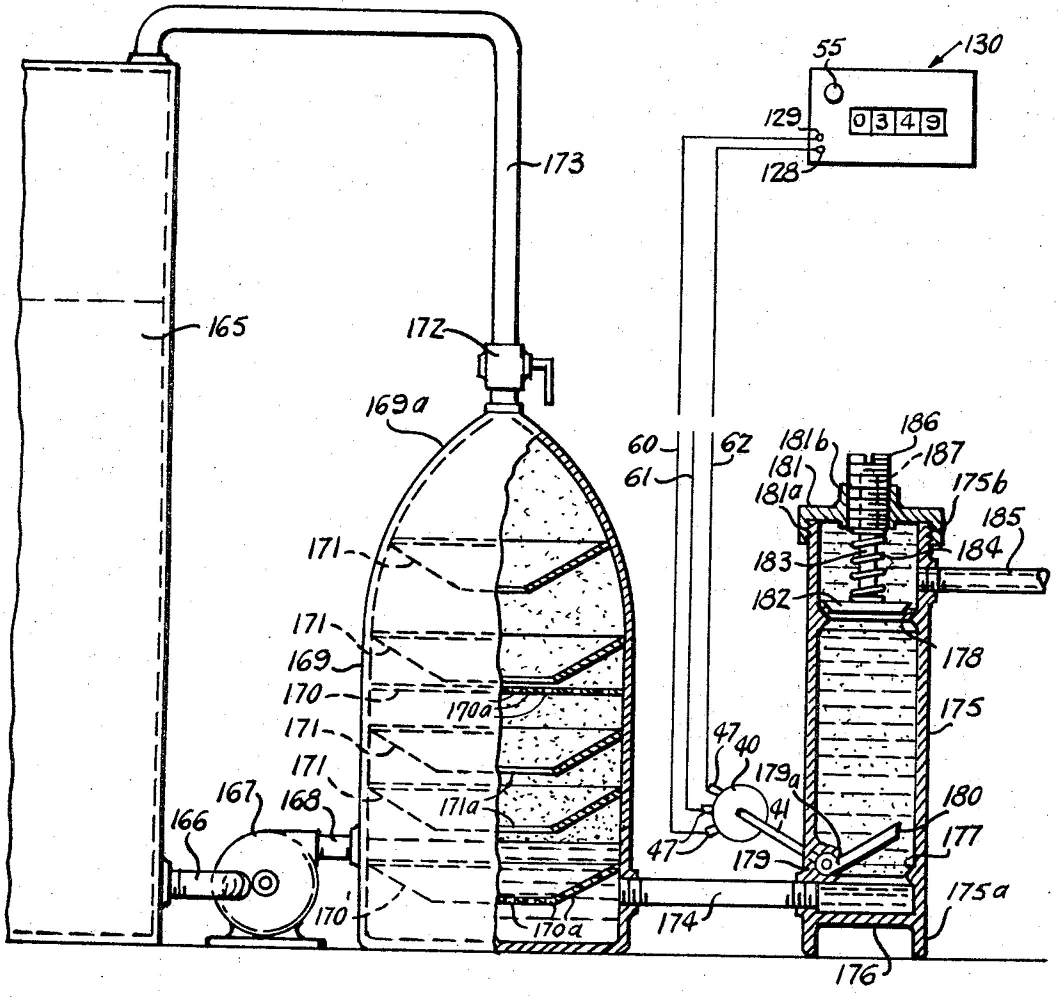

FIGURE 8–A is a detail of the circuit diagram, showing a modification of the circuit diagram of FIGURE 8;

FIGURES 9 to 17, inclusive are curves graphically illustrating the circuit performance characteristics;

FIGURE 18 is a top plan view of a particular transducer used in the computer circuit according to the present invention;

FIGURE 19 is an end elevation view of the transducer according to FIGURE 18;

FIGURE 20 is a vertical sectional view through the chute, showing the vanes and deflector in their positions for handling a small volume of flow;

FIGURE 21 is a view similar to FIGURE 20, showing the vanes and deflector in their positions for handling a large volume of flow; and FIGURE 22 is a vertical sectional view through an arrangement for determining the weight to volume ratio of liquids.

Figures 1, 2, 3, 4:
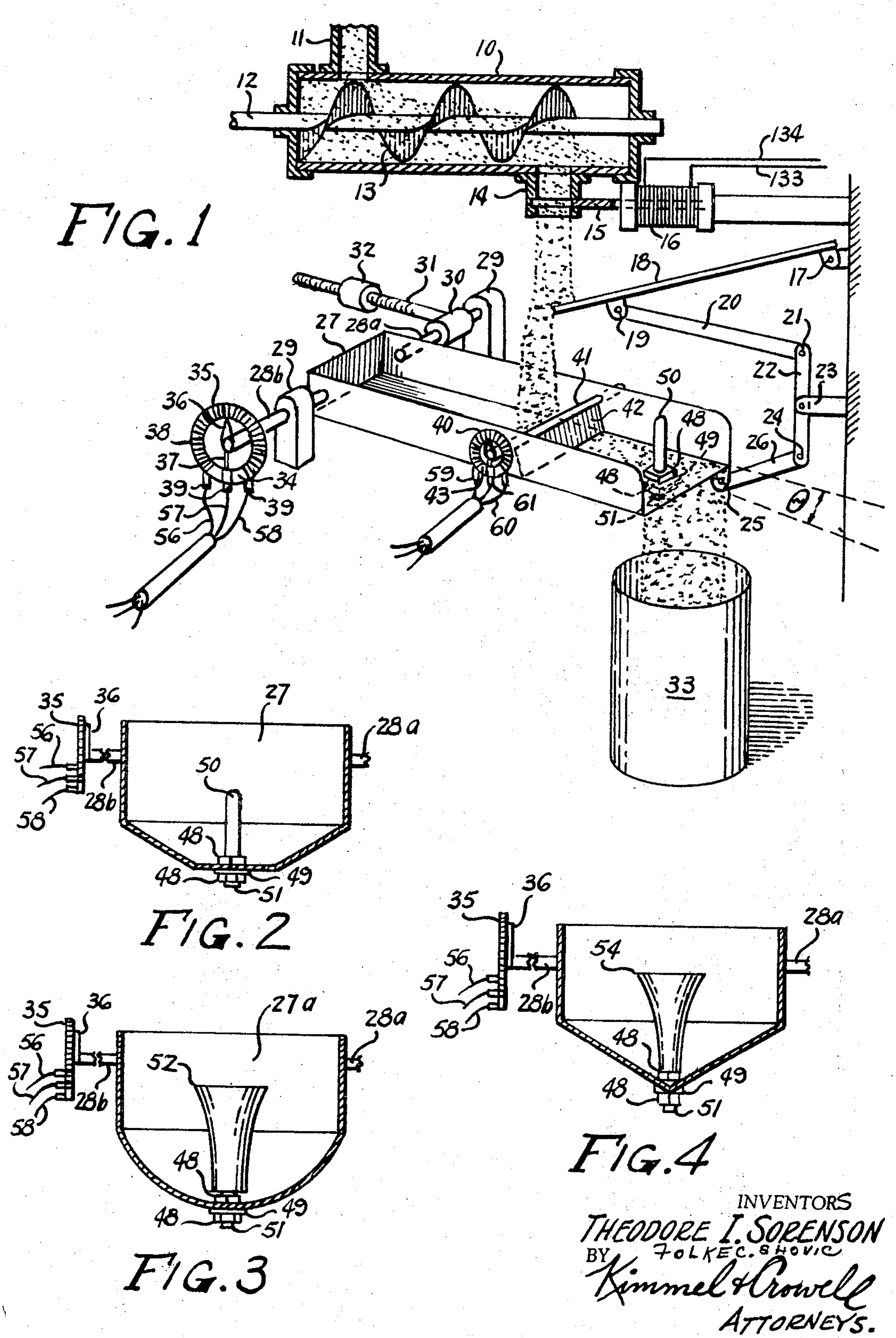
FIGURE 1 is partly a side elevational and partly a perspective view of a conveyor, an adjustable deflector, an adjustable chute, and a pair of transducers.
FIGURE 2 is an end elevational view of the chute according to FIGURE 1.
FIGURE 3 is a view similar to FIGURE 2 but showing a different shape of the chute bottom and a different form of flow restricting element.
FIGURE 4 is a view similar to FIGURES 2 and 3, but showing still different shapes of the chute bottom and the flow restricting element.
Figure 6:
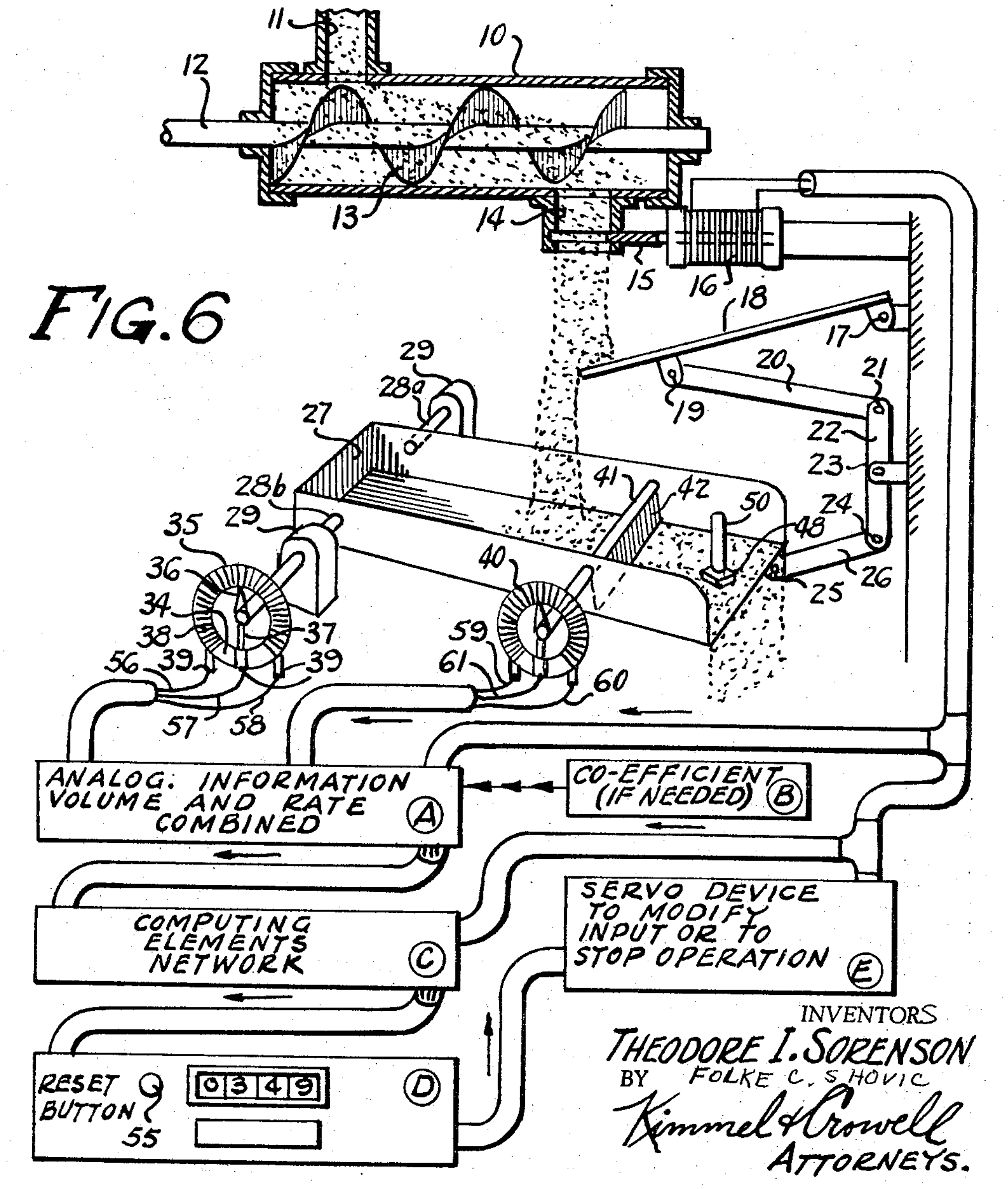
FIGURE 6 is a block diagram illustrating the principle of operation of the invention.

Referring now to the drawings in detail, and to FIGURES 1 and 6 in particular, there is here shown at 10 a conveyor of the auger or screw type. This conveyor is enclosed by a cylindrical housing and has an axially positioned shaft 12 and a helical blade 13 thereon. The shaft 12 is driven by any suitable means (not shown). An inlet conduit 11 extends from a suitable source of material supply, such as a hopper (not shown), and is connected to the cylindrical housing 10 adjacent one end of the latter. An outlet 14 is provided on the housing 10 adjacent the other end of the latter. This outlet opening may be controlled by a slide valve 15, which is operated by an electro-magnet 16. This electro-magnet is energized over conductors 133 and 134 in an electrical circuit to be later described in connection with FIGURE 7. While a screw type of conveyor has been described and illustrated, it is contemplated that other types may be used, the endless belt type being particularly adaptable in the present combination.

A deflector vane 18 is pivotally mounted at 17 on any suitable supporting structural member and is positioned below the outlet 14 from the housing 10 of the conveyor.

A chute 27 is pivotally mounted for partial rotation by two aligned sections **28*a* and 28*b* of a rock shaft, which sections are mounted in suitable holes in the side walls of the chute. These sections 28*a* and 28*b* are journalled in bearings 29—29, which are likewise mounted on any suitable structural supporting member. This chute may be set in any one of several selected positions from the horizontal to a negative angle of 30° or greater. The angle is hereinafter termed the "actual" or "geometrical angle" of the chute. A counterweight 32 is mounted on a threaded rod 31, which is secured at one end to a sleeve 30 on the section 28*a* of the rock shaft. This counterweight may be set to compensate for the moment produced by the weight of the chute and the flow sensing elements mounted therein, to be later described. The material leaving the chute is received in any suitable container 33**.

The deflector vane 18 keeps the material falling into the chute 27 in optimum positions for response by the flowing sensing elements. A link 20 is connected to the deflector vane 18 adjacent the free end of the latter by a pivot 19 and at its other end by a pivot 21 to a link 22. This link 22 is pivotally mounted along the length at 23, also on any suitable structural supporting member. Similarly, a link 26 is connected to the bottom of the chute 27 adjacent the free end of the latter by a pivot 25 and at its other end by a pivot 24 to the other end of the link 22. This interconnecting linkage between the deflector vane 18 and the chute 27 provides that, for any given position of the chute, there will be a corresponding definite position of the deflector vane. While a mechanical linkage between the deflector vane 18 and the chute 27 has been illustrated and described, an electrical or a hydraulic interconnection could as well be used.

A first transducer is comprised principally by a wire resistance winding 35, which is wound radially and progressively circumferentially around an annular disc 34 of insulating material. The section **28*b*** of the rock shaft extends axially through the annular disc 34 and carries a radially positioned arm 36, which wipes over the resistance winding 35. At its opposite ends the resistance winding 35 is connected to end terminals 39—39. The radially positioned arm 36 is connected by a short conductor 37 to a similar center terminal 39. Conductors 56, 57, and 58 are connected to the three terminals 39, as will be explained in connection with the circuit diagram of FIGURE 7.

A second transducer is mounted in the chute 27 on a shaft 41, which is journalled in suitable holes in the side walls of the chute. This shaft has a radially projecting vane 42 thereon, which extends throughout the length of the shaft within the chute. The shaft 41 and the vane 42 thereon are positioned forwardly of, that is, towards the free end of the chute, from the exit end of the deflector vane 18 over the chute. The vane 42 is thus deflected by and the transducer 40 is responsive to the flow of material down the chute.

The second transducer is similar in construction to the first transducer 35. It is comprised principally by a wire resistance winding 40, which is wound radially and progressively circumferentially around an annular disc 43 of insulating material. The shaft 41 extends axially through the annular disc 43 and carries a radially positioned arm 44, which wipes over the resistance winding 40. At its opposite ends the resistance winding 40 is connected to end terminals 47—47. The radially positioned arm 44 is connected by a short conductor 45 to a similar center terminal 47. Conductors 60, 61, and 62 are connected to the three terminals 47, as will be also explained in connection with the circuit diagram in FIGURE 7.

As stated, the transducers 35 and 40 are preferably of the resistance type. However, it is contemplated that other types of transducers, such as conductor, photoelectric, photodiode, capacitance, and inductor, for example, might well be used. The two transducers are responsive to the actual and real angle of indication of the flow chute, as will be further explained in the description of the operation.

In the form of the chute shown in FIGURES 1 and 2, the bottom of the latter is semi-trapezoidal in cross-section. A flow restricting means in the form of a cylindrical rod 50 is mounted on the bottom of the chute between the shaft 28 and the lower end of the chute, and secured in place by a bolt 51 and nuts 48—48, a washer 49 being placed between the bottom of the chute and the lower nut 48, if desired.

A modified form of the chute is shown at 27*a* in FIGURE 3. In this form the bottom is semi-elliptical in cross-section, the plane between the side walls and the bottom being along the major axis of an ellipse. The flow restricting device 52 here has its side wall of logarithmic shape.

A further modified form of the chute is shown in FIGURE 4. In this form the bottom is truncated triangular in cross-section. The flow restricting device 54 here has its side walls of parabolic shape.

It is contemplated that still other forms of the chute bottom and additional shapes of the flow restricting elements may be used. An exponential form of the latter is one shape that would be particularly applicable. It will be obvious that any of the forms of the chute bottom may be combined with any of the forms of the flow restricting device shown.

The particular shape of the bottom of the chute 27 employed and the exact mathematical shape of the flow modifying restrictions 50, 52, and 54 complement each other where a continuing co-efficient of flow is necessary. The exact shape of the flow modifying restriction employed will, of course, depend somewhat on the material being measured and will be finally determined during the calibration of a given chute for a given form of material. The modifying restrictions 50, 52 and 54 are so positioned in the chute 27 in the path of the flowing material that they make certain facts of the flow movement observable by the computer. These restrictions are designed to recognize the characteristics of the flowing material and to correctly condition the overall performance of the computer as a whole in the proper manner. This simplifies the computer's overall work computations. These, when properly added up, with the aid of suitable selected components, result in a linear presentation to the counting tally unit. Consequently, the response modifying voltage, the result of the transition from non-linear form to regular linear form, is conditioned to be acceptable to linear read out counting or tally unit device.

In the block diagram of FIGURE 6, the conveyor 10 transfers the material to the chute 27. Information is developed by the transducers 35 and 40 in the chute 27 in analytical or digital form. This information is transmitted to the box A, where it is assembled as to the rate of flow. Box B is electrically connected to box A and a flow coefficient is developed in box B for transmission to box A, if needed. The information is then transmitted to box C and is combined as to volume and rate by a computing element, the result being the total quantity weight. The total is then transmitted to box D, which is a digital read out, including a conventional predetermining counter. This counter can be pre-set for any given amount and, when that amount is reached, it will shut off automatically. The counter is provided with a re-set button 55. As an alternative, the counter D can be used for totalizing. Additional counters may be provided in the box D to accomplish various desired purposes. Box E is a servo device and may either control the flow of material into the chute 27 or start and stop same entirely. As shown, it is electrically connected to the electro-magnet 16 which operates the slide valve 15 for controlling the outlet opening from the conveyor 10. It may thus initiate, increase, reduce, or stop entirely the flow of material after a predetermined volume or weight has passed from the conveyor 10 into the chute 27. The box E is also electrically connected to the boxes A and C for controlling the operation of these components.

The box E could, however, contain a servo device, such as the Servo Device according to U.S. Patent No. 2,932,785 to Shovic. In such case it may replace the predetermining counter D in carrying out process control. For example, it could be used to control the coloring matter in, consistency of, or volume or overall weight in the manufacture of numerous articles.

Figure 7:
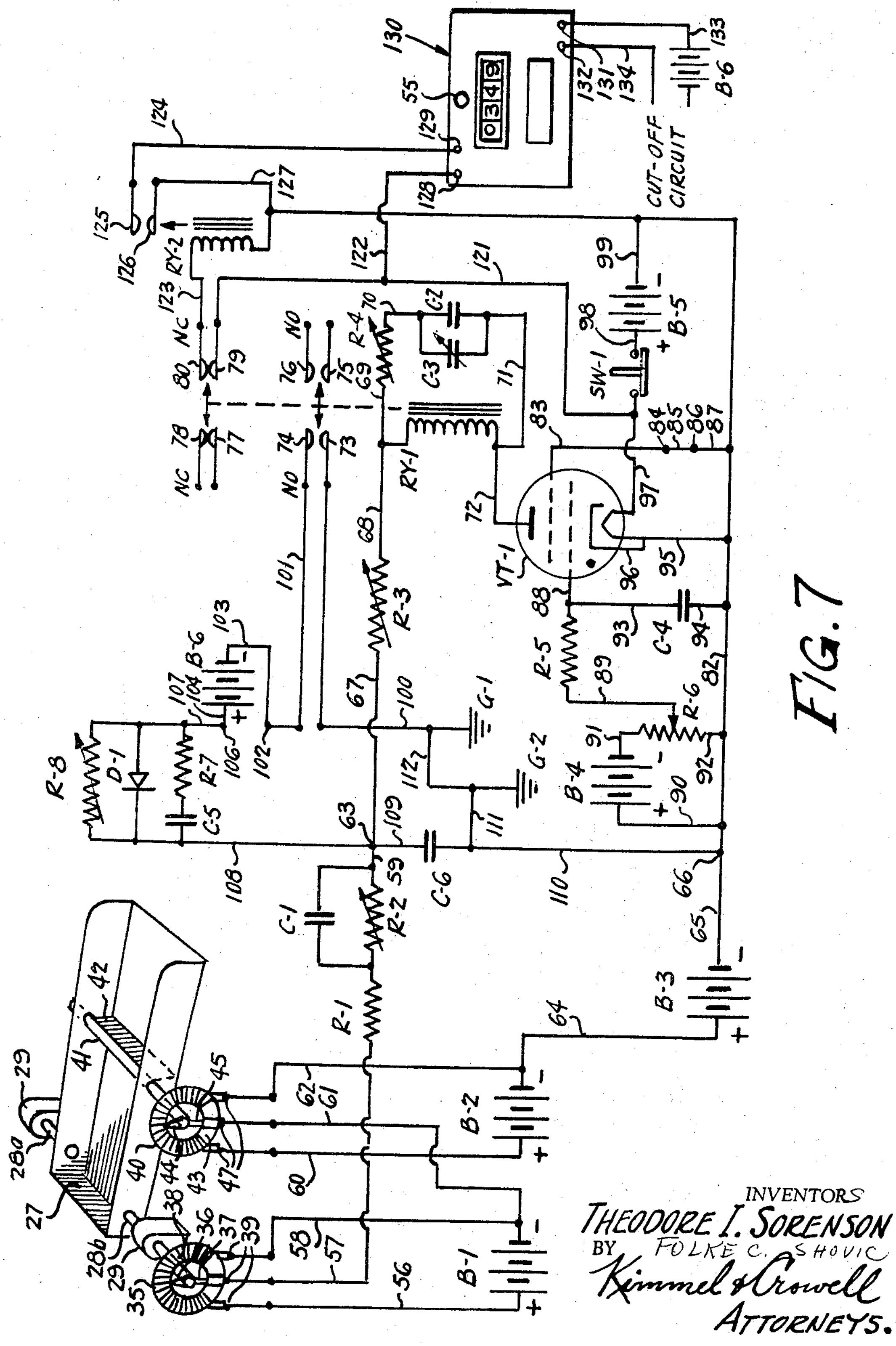
FIGURE 7 is a circuit diagram.

The circuit is shown in FIGURE 7. A battery B–1 is connected across the resistance element of the transducer 35 by conductors 56 and 58; similarly, a battery B–2 is connected across the resistance element of the transducer 40 by conductors 60 and 62. The arm 36 of the transducer 35 is connected by a short conductor 37, through the center terminal 39 and a conductor 57 to an R-C circuit, and by a conductor 59 to one input terminal 63 of the computer circuit. The R-C circuit is comprised by a fixed series resistor R–1, a variable series resistor R–2, and a fixed capacitor C–1 in parallel with the variable resistor R–2. These components, along with a series resistor R–3, comprise a pulse shaping circuit, as will be later described.

The arm 44 of the transducer 40 is connected through the short conductor 45 and center terminal 47, and by a conductor 61 to the negative terminal of the battery B–1. The negative terminal of the battery B–2 is connected by a conductor 64 to the positive terminal of a battery B–3; the negative terminal of this battery is connected by a conductor 65 to the other input terminal 66 of the computer circuit.

The first input terminal 63 of the computer circuit is connected by a conductor 67 to one side of a variable series resistor R–3; the other side of this resistor is connected by a conductor 68 to one side of the winding of a master relay RY–1; and the other side of the winding of the relay is connected by a conductor 72 to the current collecting electrode (anode) of an electronic release device VT–1.

The fixed resistor R–1, variable resistors R–2 and R–3, and shunt capacitor C–1 comprise a pulse shaping circuit, which produces the computing action that is inherent in the computer as a whole, as will be further described in the operation.

A time constant modifying circuit for the relay RY–1 is provided. This circuit is comprised by a conductor 69 from one side of the winding of the relay, to one side of a variable resistor R–4, a conductor 70 from the other side of this resistor to one side of a fixed capacitor C–2, and a conductor 71 from the other side of the capacitor to the other side of the winding of the relay. A variable capacitor C–3 is shunted across the fixed capacitor C–2.

The electronic release device VT–1 is illustrated as a dual grid tube having the "Thyratron" type characteristic. However, the present computer circuit is not limited to the use of an electronic tube. The circuit will operate equally as well with a solid state electronic release device, as distinguished from the vacuum type device, such as an electronic tube. One type of solid state electronic release device with which the circuit operates very well is the silicon controlled rectifier type. The interchanging of the two types of electronic release devices will not affect the computing action of the circuit or the accuracy of the computing operation. This results in some economy of construction and, when the solid state electronic device is used, there is the advantage of a lower operating temperature in the computer cabinet.

A common return conductor 82 is connected from the second input terminal 66 to one side of the winding of a slave relay RY–2, to be later described.

Where an electronic tube is employed as the component VT–1, it is, as above stated, of the dual grid type. Also, as above described, one side of the winding of the master relay RY–1 is connected by a conductor 72 to the anode or plate of the tube. One grid of the tube is connected by a conductor 83 to an input terminal 84; the complementary input terminal 86 is connected by a conductor 87 to the common return conductor 82.

When the material being weighed is in the form of balls or lumps, it is contemplated that a transducer will be mounted either in the chute 27, or in another chute positioned above or below the chute 27, and connected to the input terminals 84 and 86. In ordinary operation, where the material is a freely flowing solid or liquid, this part of the circuit is not used and the input terminals 84 and 86 are bridged by a connecting link 85, as shown.

The other control grid of the tube is biased at a predetermined potential; it is connected by a conductor 88 to one side of a fixed biasing resistor R–5 and the other side of this resistor is connected by a conductor 89 to the arm of a potentiometer or voltage divider R–6. A battery B–4 is shunted across the resistance element of the voltage divider R–6, the negative terminal of this battery being connected by a conductor 91 to one side of the resistance element, the positive terminal of the battery being connected by a conductor 90 to the common return conductor 82, and the other side of the resistance element being connected by a conductor 92 to the common return conductor 82. A filter capacitor C–4 is connected by conductors 93 and 94 between the grid conductor 88 and the common return conductor 82.

One side of the heater of the tube is connected by a conductor 95 to the common return conductor 82; and the other side of the heater is connected by a conductor 97 to one terminal of an "On" and "Off" switch SW–1; the other terminal of this switch SW–1 is connected by a conductor 98 to the positive terminal of a battery B–5; and the negative terminal of this battery is connected by a conductor 99 to the common return conductor 82. The current emitting electrode (cathode) of the tube is connected back onto the heater conductor 95 by a conductor 96.

The circuit for producing a pulse across the input terminals 63 and 66 is comprised on one side by a first ground connection G–1, a conductor 100 and one normally closed contact 73 of the master relay RY–1; also from the complementary normally closed contact 74 of the relay to one input terminal 102 and from the complementary input terminal 106 over a conductor 107. The other side of this circuit is over a conductor 108 to the first input terminal 63, over a conductor 109 to one side of a capacitor C–6, and from the other side of this capacitor over a conductor 110 to the second input terminal 66. The latter side of the capacitor C–6 is also connected over a conductor 111 to a second ground at G–2. In order to illustrate the complete circuit, a conductor 112 is shown between the grounds G–1 and G–2.

A battery B–6 may be connected to the input terminals 102 and 106 by conductors 103 and 104, respectively.

Between the conductors 107 and 108 there is a three branch circuit. The first branch is comprised by a fixed resistor R–7 and a capacitor C–5; a second branch is comprised by a diode rectifier D–1; and the third branch is comprised by a variable resistor R–8.

When the computer is used for determining the weight to volume ratio of sticky substances, such as sugar, which tend to adhere to the bottom and side walls of the chute 27, a third transducer is used, as shown in FIGURE 8. This transducer, by reason of its location in the chute, assists the other transducers 35 and 40 to give a more accurate analog voltage. The transducer is connected by conductors 103 and 104 to the input terminals 102 and 106, in place of the battery B–6.

The third transducer is positioned between the second transducer 40 and the exit end of the chute 27. It is comprised principally by a wire resistance winding 115, which is wound radially and progressively circumferentially around an annular disc 116 insulating material. At its opposite ends the wire resistance winding is connected to outer terminals 119–119.

A shaft 113 extends through suitable aligned holes (not shown) in the side walls of the chute. This shaft has a radially positioned vane 114 thereon, which extends throughout the length of the shaft within the chute and contacts the side walls and bottom of the latter. It also extends axially through the annular disc 116 and carries a radially positioned arm 117, which wipes over the resistance winding 116. The radially positioned arm 117 is connected by a short conductor 120 to a center terminal 119. The conductors 104 and 103 from the input terminals 102 and 106 are connected to the outer terminals 119—119; the center terminal 119 is connected by a conductor 105 to the negative terminal of the battery B–1.

The above described circuit arrangement, with the radially positioned arm 117 of the third transducer 115 connected to the negative terminal of the battery B–1, is the preferred arrangement for determining the weight to volume ratios of certain types of materials. For determining the weight to volume ratios of other materials however, the circuit arrangement according to FIGURE 8–A is preferred. In this circuit arrangement the conductor 105 from the radially positioned arm 117 of the third transducer is connected to the positive terminal of the battery B–2.

It will be noted that the input to the electronic release device VT–1 is to the anode or plate. This is contrary to the usual electronic circuit arrangement, where the input is to the control grid of the tube. The operating circuit for the predetermining counter 130, to be later described, will therefore be hereinafter referred to as a "backward circuit."

As above stated, the relay RY–1 is a master relay and controls the operation of the slave relay RY–2, as will be later described. The relay according to U.S. patent to Shovic No. 2,854,544 is well adapted for operation as the relay RY–1 in the herein described circuit. This relay is characterized by the features of high speed of operation, quick response when operated or released, dependability of contact closure, and the absence of any transient voltage developed at the contacts. In the circuit according to the present invention, however, the features of high speed operation and quick response, when operated or released, are not entirely desirable. The above-described time constant modifying short circuit comprised by the variable resistor R–4 and the fixed capacitor C–2 and variable capacitor C–3 is therefore provided.

As the master relay RY–1 according to the Shovic patent is being commercially produced, it has two pairs of normally open contacts 73–74 and 75–76 and two pairs of normally closed contacts 77–78 and 79–80. As previously stated, the first pair of normally open contacts 73–74 are connected in the circuit for developing a pulse across the input terminals 63 and 66. The pulse is developed when the relay is energized and the contacts are closed. In the circuit according to the present invention the second pair of normally open contacts 75–76 and the first pair of normally closed contacts 77–78 are not used.

A predetermining counter 130 is the terminal component of the circuit. This is preferably the Predetermining Counter, Model F–185, as made by the Presin Co., Inc. The operation of this counter is controlled by the slave relay RY–2. The energizing circuit for the relay RY–2 is from the positive terminal of the battery B–5 over the conductor 98; through the "On" and "Off" switch SW–1, over a conductor 121, the normally closed contacts 79–80 of the master relay RY–1, a conductor 123, through the winding of the slave relay RY–2, a conductor 124 and over the common return conductor 82 and the conductor 99 to the negative terminal of the battery B–5. The local circuit for the predetermining counter is on one side from the positive terminal of the battery B–5 over the conductor 98, the "On" and "Off" switch SW–1, the conductor 121, and a conductor 122 to one input terminal 128 of the predetermining counter; the other side of this circuit is from the complementary input terminal 129 over a conductor 124, through the normally open contacts 125–126 of the relay RY–2, a conductor 127 and over the common return conductor 82 and the conductor 99 to the negative terminal of the battery B–5. It will be apparent from the described circuit that the slave relay RY–2 is self holding. The output terminals 131 and 132 of the predetermining counter 130 are connected by conductors 133 and 134, respectively, to any instrumentality which it may be desired to control. As shown, they are connected to the electro-magnet 16 which operates the slide valve 15 controlling the outlet opening 14 from the conveyor 10. A battery B–6 is included in this circuit. The predetermining counter 130 is identical with the component illustrated by the block D in the block diagram of FIGURE 6 and likewise has a reset button 55 thereon.

A particular form of transducer that is well adapted for use in the computer circuit according to the present invention is shown in FIGURES 18 and 19. The transducer is mounted on a plate 135. This plate is adapted to be mounted on any suitable fixed support, such as the bearing brackets 29, by rods 137. Screws 138 extend through suitable holes (not shown) in the plate 135 and are received in axial screw threaded holes in the rods 137. A bushing has a head 139, which abuts the plate 135 on one side, and a screw threaded barrel 140 which extends through a hole 136 in the plate 135. The bushing is held in place by a nut 141, which is received on the screw threaded barrel 140 and abuts the plate 135 on the other side. A shaft 142 is rotatably mounted in the barrel 140 of the bushing and has a collar 143 force fitted therein, which abuts the end of the barrel. This shaft may be secured to one side wall of the chute 27 in the same manner as the rock shaft section **28*b* in the chute constructions according to FIGURES 1 and 7. A radially positioned contact arm 145 is secured to the outer end of the shaft 142 and bears on the head 139 of the bushing. The contact arm 145 is held in place by a disc 143 having a central hole (not shown) therein and a screw 144, which is received in an axial screw threaded hole in the outer end of the shaft 142. At its outer end the arm 145 carries a ball 146**, which is swaged in place.

The resistance element 147 of the transistor is comprised by an arcuate segment 147 of resistance material, which is secured to the plate 135 in any suitable manner and over which the ball 146 rides. This segment is of constant radius of curvature on its inner side and of uniformly decreasing radius of curvature on its outer side in the counter-clockwise direction of rotation of the radial arm 145. As the resistance of any linear element is a function of the reciprocal of the cross-sectional area, the segmental resistance element 147, shaped in the described manner, can be co-ordinated with the flow characteristics of the chute 27. A connector lug 149 is provided on the disc 143 and connector lugs 149—149 at the opposite ends of the segment element 147, these connector lugs being similar to the terminals 39 on the transducer 35 in the circuit arrangements of FIGURES 1, 5, 7 and 8.

In FIGURES 20 and 21 there is shown a modified form of the flow chute, which is here designated 150. This modification of the flow chute is adapted to handle either very small or very large volumes of flow. The conveyor 10 and the slide valve 15 function and the electro-magnet 16 is operated in the same manner as in the arrangement according to FIGURE 1. The chute 150 is supported at one corner on a pivotal mounting 151, which latter is part of any suitable fixed supporting surface. One side of the chute is flared upwardly and outwardly at **150*a*, this being the inlet for receiving the flowing material, which leaves from the outlet 14 of the conveyor 10. The deflector vane 18 is here secured to one arm of a bell crank lever 156, which extends through a slot in the opposite side wall of the chute, a pivotal mounting 157 is provided on any suitable fixed supporting surface for the bell crank lever 156 and the other arm of the latter is pivotally connected at 158 to one end of a reversing lever 159. A second pivotal mounting is provided at 160 on the supporting surface for the reversing lever 159 and the other end of the latter is pivotally connected at 163 to the bottom of the chute. It will thus be apparent that any swinging movement of the chute is transmitted through the linkage 162–159–156 to the deflector vane 18** to move the latter through a corresponding angle.

Figure 5:
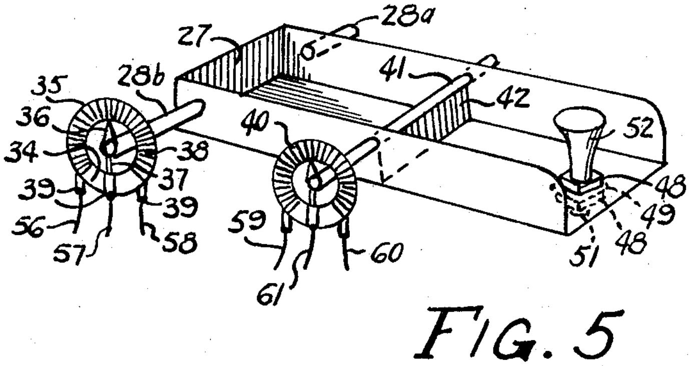
FIGURE 5 is a detail perspective view of the chute according to FIGURE 1.

The transducers 35 and 40 in this arrangement are each responsive to both the angular position of the chute 150 and the flow of the material through same, instead of the transducer 35 being responsive to the angular position of the chute and the transducer 40 responsive to the flow of the material through the latter, as in the arrangement according to FIGURES 1, 5, and 7. The transducer 35 is positioned near the exit end of the chute. Its shaft 28 is journalled in aligned holes in lugs 155—155 on one side wall of the chute. A vane 38 is mounted on the shaft 28 and extends through a first elongated slot 153 in the side wall of the chute. Below the slot 153 there is a stop 154 mounted on the inner side wall of the chute. This stop limits the downward and swinging movement of the vane 38 to a predetermined angle. The threaded arm 31 on the shaft 28 here carries two counterweights 32—32.

The transducer 40 is also mounted on the side wall of the chute 150 and above the transducer 35. Its shaft 41 is likewise journalled in aligned holes in lugs 155—155 on the side wall of the chute. The vane 42 is mounted on this shaft 41, as in the modification according to FIGURES 1, 5, and 7, and extends through a second elongated slot 153 in the side wall of the chute. Below this latter slot there is likewise a stop 154 mounted on the inner side wall of the chute. This stop similarly limits down and swinging movement of the vane 42 to a predetermined angle. The threaded arm 31' on the shaft 41 here carries a single counterweight 32'.

As shown in FIGURE 20, a light volume of flowing material will in part strike the deflector vane 18 and be reverted onto the transducer vane 42 and in part directly strike the transducer vane. This vane will be swung, partly or fully, until it strikes its stop 154, and the radial arm 44 of the transducer will be rotated through the same angle. Similarly, the flowing material leaving the transducer vane 42 in part falls onto the transducer vane 38, and then slides off same and falls into the container 33, and in part falls directly into the container. The transducer 35 however is not operated since, due to the dual counterweights 32—32 on the arm of its shaft 28, it is responsive only to a heavy degree of impact.

When however a large volume of material is flowing through the chute 150, as shown in FIGURE 21, part of same will likewise strike the deflector vane 18 and be reverted onto the transducer vane 42 and part will directly fall onto the transducer vane. Both parts however are larger in volume. The vane will be swung through its full arc of rotation and will strike its stop 154. The flowing material again falls in part onto the transducer vane 38 and in part directly into the container 33. The first part however falling onto the transducer vane 38 will be larger in volume than with the small volume flowing in FIGURE 20, and the transducer vane 38 is swung through at least a part of its arc of partial rotation, or fully swung through the arc and strikes its stop 154. In either case the transducer arm 36 is moved through the same angle.

It will be noted that, as the chute 150 is swung around its pivotal mounting 151, the transducer vanes 42 and 38 are held by the counterweights 32′ and 32—32, respectively, in the positions that they occupy when no material is flowing through the chute. Thus the respective angles which the vanes make with respect to this side wall of the chute 150 is a function of the angular position of the chute.

When used for determining the weight-volume ratio of a liquid, the computer circuit will produce the same computational response with a suitable sensitive transducer selected according to the flow characteristics of the liquid, as in the case of flowable solids. Such an arrangement is shown in FIGURE 22. This particular arrangement is well adapted for handling liquids generally. As a specific example, however, it is hereinafter described as for handling a liquid fuel, such as butane. A storage tank for the liquid fuel is of generally cylindrical shape, and is designated by the reference numeral 165, but has a bullet nose shaped top. The tank 165 may be either a stationary tank, or a portable one, mounted on a motor truck or a flat car (not shown). At the bottom of the tank there is a liquid outlet pipe 166, which is connected to the inlet of a rotary pump 167. This pump is driven by an electric motor, or other suitable driving means (not shown). At the bottom of the tank there is a liquid outlet pipe 166, which is connected to the inlet of a rotary pump 167. This pump is driven by an electric motor, or other suitable driving means (not shown). The outlet of the pump 167 is connected by a pipe 168 to a bleeder chamber 169 adjacent the bottom of the latter. On the other side of the bleeder chamber, and at a slightly lower level, there is an outlet pipe 174 which leads to a valve chamber 175, to be later described. Within the bleeder there is a lower separator plate 170′, which is of inverted frusto-conical shape. This plate has spaced holes 170*a* over its frusto-conical side wall and bottom. The plate is positioned below the opening through which the inlet pipe 168 enters the bleeder chamber, and above the opening through which the outlet pipe 174 leaves the chamber. As thus positioned it divides the interior of the bleeder chamber into lower liquid and an upper gas compartments. It also allows the liquid to flow from the bleeder chamber through the outlet pipe 174 and into the valve chamber 175 but prevents the gas from so doing. Above the separator plate 170′ there is an upper plate 170. This latter plate is of plane formation, has holes 170*a* over almost all of its area, and is positioned in a diametral plane of the bleeder chamber. One function of this upper perforated plate 170 is to limit the height of the liquid column in the bleeder chamber 169 in case the liquid is forced into the bleeder chamber by the pump 167 at a more rapid rate than it leaves through the outlet pipe 174, and hence the level of the column rises above the lower separator plate 170. Ordinarily, however, the level of the liquid will be at the lower separator plate 170, as shown on FIGURE 22 of the drawing, so that only liquid goes from the bleeder chamber 169 through the outlet pipe 174 to the valve chamber 175, to be measured in the latter. Between the lower separator plate 170′ and the upper plate 170 there is a first series of baffles 171; above the upper plate 170 there is a second series of baffles 171. These baffles are similar in formation to the lower separator plate 170′, except that there are no perforations in the frusto-conical side walls of same and they are open over their smaller bases or center sections. The uppermost of these baffles is of lesser diameter than the ones below, due to the reduced diameter of the top 169*a* of the bleeder chamber. The upper perforated plate 170 also functions as a baffle and, with the lower and upper series of baffles 171, serves to mechanically separate the suspended liquid from the gas. As to vapor rising from the level of the liquid at the lower separator plate 170, the suspended or transient liquid therein is removed by the two series of baffles 171 and the upper perforated plate 170, so that only liquid goes from the bleeder chamber 169 through the outlet pipe 174 to be measured. The liquid so separated above the upper perforated plate 170 drops downward onto and passes through the holes 170*a* in the latter; likewise, the liquid so separated above the lower separator plate 170′, together with that passing through the holes 170*a* in the upper perforated plate, drops downward onto the lower separator plate 170′ and, if the level of the liquid in the liquid chamber is below this plate, runs through the openings 170*a* in the latter. The gas, from which the suspended liquid has been removed, passes upwardly through the top 169*a* of the bleeder chamber and through a pipe 173 to the top of the storage tank 165 and enters the latter above the liquid level in same. A check valve 172 is placed in the pipe 173, adjacent the junction of the latter with the top 169*a* of the bleeder chamber. If the liquid level in the storage tank 165 should rise to the top of the tank, this check valve prevents the liquid from flowing backward through the pipe 173 and into the bleeder chamber 169. As previously stated, an outlet pipe 174 leads from the liquid compartment at the bottom of the bleeder chamber 169 and this pipe is connected to a valve chamber 175 at the bottom of the latter.

The valve chamber 175 functions as a conduit for the liquid fuel in the same manner as the chute 27 for the flowable solid material in the arrangement according to FIGURES 1, 5, and 8. The valve chamber has a bottom 176, a supporting flange 175*a* below the bottom, and is open at its top and exteriorly threaded around the latter at 175*b*. Above the bottom 176 there is formed on the inner wall of the valve chamber a first valve seat 177. Along the valve seat 177 and chordally of the latter a boss 179 is formed on the inner wall of the valve chamber. A slot 179*a* is formed in the boss 179 and chordally of the latter, this slot being in horizontal alignment with the valve seat 177. The shaft 41 of the transducer 40 extends through a chordally positioned base (not shown) in the boss 179. Suitable sealing gaskets (not shown) are provided where this shaft passes through the wall of the valve chamber 175. On this shaft this is mounted a flap valve 180. In its closed position the valve 180 rests on the valve seat 177; in its open position it abuts the upper edge of the slot 179*a* in the boss 179, this edge functioning in the same manner as the stops 154 for the transducer vanes 38 and 42 in the arrangement according to FIGURES 20 and 21.

The conductors 60, 61, and 62 from the transducer 40 are connected into the computer circuit in the same manner as shown in the circuit diagrams of FIGURES 7 and 8, or 8–A.

The valve chamber 175 is closed at its top by a plate 181 which has an internally screw threaded skirt 181*a* for engagement with the threaded end 175*b* of the valve chamber, and a central boss 181*b* with a screw threaded hole through same. Adjacent its top the valve chamber is formed on its inner wall with a second valve seat 178. A disc type check valve 182 is mounted for vertical movement and rests on the valve seat 178 in its closed position. In the threaded hole through the boss 181*b* on the end plate 181 there is mounted a screw threaded rod 186, which has an axial bore 187 extending from its lower end for part of its length. The valve 182 has a stem 183, which is slidably received in the axial bore 187 in the rod 186. Around the valve stem 183 there is a coiled compression spring 184, which abuts the valve disc 182 at its lower end and the threaded rod 186 at its upper end and serves to bias the check valve to its closed position. Above the valve seat 178 a pipe 185 is connected into the valve chamber. When the entire apparatus is stationary, this pipe 185 will be connected to the fuel hauling tank on a motor vehicle, while the tank is being filled; this will likewise be the case where the apparatus is portable as by being mounted on a railway car; where however the apparatus is portable, as by being mounted on a motor truck, the pipe 185 will be connected to the customer's storage tank, while the latter is being filled.

The check valve 182 is operated by the movement of the liquid through the valve chamber 175 against the action of the coiled compression spring 184. The spring loading of the valve applies the proper modifying effect on the liquid present in the valve chamber.

In order to fully understand the effect of this spring loading, let it be assumed that the coiled compression spring 184 has a modulus of X pounds per linear inch. There is then produced an effect that is the same as that in the solid material handling apparatus according to FIGURE 1. In the liquid handling apparatus according to FIGURE 22, the relationship of the spring loaded check valve 182 to the transducer operating flap valve 180 is quite like that of the counterweight 32 on the chute 27 in the solid material handling apparatus. As to the transmission of forces from the check valve 182 to the flap valve 180, this takes place through the column of liquid in the valve chamber 175 in similar manner to the transmission of the moment of the counterweight 32 through the stub shaft 28*a* to the chute 27 in the solid material handling apparatus.

In the operation of the computer it should be understood that an essential feature of the invention is the combination of the chute with the computer circuit which will enable the weighing of the material as it moves down the pivoted chute 27. Also, that the main purpose of the invention is to measure the weight-volume ratio of a given quantity of moving grain or other material, including flowing liquids.

At the start of the weighing operation the chute 27 is balanced by setting the counterweight 32 on the radial arm 31. The material of which the weight-volume ratio is to be measured is forced through the conveyor 10 by the helical blade 13, passes through the outlet opening 14, which is controlled by the slide valve 15, and falls partly onto the deflector vane 18 and partly directly into the chute 27. The principal function of the deflector vane 18 is to direct the flow of the material to a favorable area of the chute 27. The angle at which the deflector vane is set is determined by the physical characteristics of the material being weighed. In adjusting the deflector vane to the proper angle, its movement is transmitted to the chute 27 by the linkage 20–22–26. This arrangement keeps the material in the optimum location in the flow sensing chute. As the chute is swung through an angle by movement transmitted through the linkage 20–22–26, it partially rotate the shaft 28 and the transducer arm 36. The activating force of the material being weighed consists in part of the same striking the deflector vane 18, and thence falling onto the chute 27, and part directly falling onto the chute, and the combination of these two actions moves the chute, which combined movement in turn partially rotates the transducer arm 36. The movements so far described are solely mechanical but could be hydraulic, if such a form of transmission would be used between the deflector vane 18 and the chute 27. As soon, however, as the transducer arm 36 is partially rotated, there is a transition from mechanical to electronic operation.

The rate of flow of the material along the chute 27 is a function of a number of variables, the angle of inclination of the chute, the initial velocity of the material entering the chute, the shape of the bottom of the chute, the form of the flow restricting element, 50, 52, or 54, and the coarseness or fineness of the material itself, if solid, or the viscosity, if liquid. The computer circuit according to the instant invention, therefore, involves the simultaneous generation of several mathematical functions, which interact in a distinctive manner and in the end serve to shape a non-linear flow rate signal to a substantially linear form, which can be counted in linear units.

The angle of inclination of the chute can be set by adjusting the counterweight 32 and setting the deflector vane 18 as above described. Concerning the shapes of the bottom of the chute, as above stated, any one of those according to FIGURES 2, 3, and 4 may be combined with another form of flow restricting element according to one of the other figures, or with still other forms of this element, as determined by the physical characteristics of the material being weighed. The proper combination of the shape of the chute bottom and the shape of the flow restricting element simplifies the computer's overall work computations.

The flow restricting elements 50, 52, and 54 in the flow chute 27, or equivalent pipe in the case of liquids, provide a continuing coefficient of flow. These flow restricting elements are positioned in the chute 27 in the path of flow of the material so that certain characteristics of the movement of the latter are sensed by the computer. The latter is designed to recognize and condition its own overall performance in the proper manner. Consequently, it conditions the response modifying voltage in the transition from non-linear form to the linear form acceptable to a linear reactant counting or tally device. These flow restricting elements are preferably of some mathematically correct shape, the exact form of any given element to be used depending upon the material or liquid undergoing measurement. The determination of the exact form of the flow restricting element to be used would be made during the calibration of a given chute for a particular type of material.

The overall performance of the complete circuit according to the present invention is similar to the response of some of the human senses, as different stimuli will give different responses at the output. These responses are entirely dependent upon the character and magnitude of the input signal at the input terminals 63 and 66 of the computer circuit. In this particular case the stimuli consist of the rate of flow or movement of the material. This constitutes the variable input information.

The type of material being measured will determine whether or not there will be more than one transducer in the flow sensing chute 27, or more than one flow sensing chute range one above the other and secured to the rock shaft 28 and one or more transducers in each chute. All of the transducers described transform some function to an analog counterpart. Where one, two or three transducers are used, their function is to translate several variables, principally the angle of inclination of the chute 27 and the flow of the material along same, into an analog voltage. All of the transducers described perform this function but it is the case that the magnitudes of the voltages developed may differ by some amount. A simple farm type of weighing apparatus will require only one transducer because of the uniform nature of the materials to be weighed, principally grains.

The transducer 35 is responsive to the "actual" or "geometrical angle" of inclination of the flow chute 27. It is the function of this transducer to convert the angle of inclination into an analog of the counterpart of the actual flow of the material. The geometrical angle of inclination of the flow chute 27 has as its electronic equivalent the "real angle" of the chute. From this it follows that the voltage developed by the arm 36 of this transducer is directly related to the amount of material falling into the chute.

Similarly, the transducer 40 is responsive to the rate and amount of material flowing through the chute 27. It is only through the circuitry described that these two variables, rates and flow weight rate, can be properly combined. The quiescent electro-motive force present across the input terminals 63 and 66 of the computer circuit is, therefore, a function of the instantaneous positions of the transducers 35 and 40. This electromotive force constitutes the signal which is presented to the anode or plate of the electronic release device VT–1 and it is of variable direct current nature. The exact wave form and magnitude are initially determined by the combined operation of the transducers 35 and 40. If the signal is of sufficient magnitude, it will be released as a pulse of energy through the electronic release device VT–1. The exact point at which it will be released is determined by the voltage on the second control grid of this tube, this voltage being variable by the potentiometer or voltage divider R–6. When the pulse is released, the energizing circuit of the master relay RY–1 is completed over the conductor 72, and from the anode or plate to the cathode or the electronic release device and over the conductors 96 and 95 to the common return conductor 82.

The resistors R–1, R–2, and R–3 and the capacitor C–1 are part of an R–C (resistance-capacitance) circuit network which give a predetermined shape to the pulse on a time base as compared to the initiating time base envelope. The resistors are pulse shapers and the capacitor C–1 supplements the resistors to perform the desired mathematical function. A pulse is fed into the resistor-capacitor network and is definitely changed in shape and duration due to the electronic values of the resistors and the capacitors. These electronic values comprise the total impedance of the circuit network. If the circuit connections of one or two of the components of the network are changed or components having different electronic values are substituted, the result will be an answer that is related to the initial pulse as operated upon by the components in the computer circuit as a whole. The same is true of the shaping circuit for the pulses produced by the third transducer 115, which circuit is comprised by the variable resistor R–7, diode rectifier D–1, and the fixed resistor R–8 and capacitor C–6.

While the computer circuit according to the present invention has been described in connection with a conveyor and a chute for determining the weight-volume ratio of flowable material, it is also applicable to a conventional lever arm and weight or spring balanced scale. In this use the broad information acceptance of the particular circuit is utilized. This is what has been referred to above as the "backwards circuit," as the major part of the input signal is fed to the anode or plate of the electronic release device and serves as the controlling release component.

With the electronic release device VT–1 connected in the backwards manner as described, a new approach is required for an understanding of its operation. It has been previously pointed out that all of the capacitors C–1 to C–6, inclusive, and all of the resistors R–1 to R–7, inclusive, are carefully selected as to their values to enhance the novel repeatable behavior of the backwards circuit. Some power is lost in these components but this is not important since a suitable power stage can be added for receiving the type of signal effected by the momentary energy requirements. The addition of smoothing nets, if desired, will not in any way alter the novel features of the instant circuit.

When the circuit according to the present invention is used as a voltage selector, it will perform as an aperture or opening, permitting a voltage of a predetermined value to signal its preference, and this voltage ignores or overrides all other voltages present. The dimensions of this aperture would be selecetd by two or three controls at the discretion of manual operation, or through the mechanical or electronic operation of a suitably designed electronic cicuit which is sensitized to the voltage sought.

The backwards character of the instant circuit makes same readily adaptable for the solution of many present day electronic problems, which cannot be solved by the existing electronic devices, in that this circuit does not contain a mandatory phase reversal. It follows that, if it does not reverse the phase of the variable being operated upon, it will allow controlled lag or lead to be inserted at the actual start of the variable if it should be desired to do so.

This 180° turnabout or backwards circuit has an additional novel feature. As has been previously pointed out, the electronic release device VT–1 does not operate in the manner usual in electronic circuits, since all the information signals are fed into the anode or plate circuit. In the circuit as here described and illustrated, the total response modifying voltage energy is directed at a variable number of electronic degrees back into the portion of the circuit that varies both with the pulse repetition rate and the pulse duration. As a result, the electronic release device VT–1 responds immediately to either impulse, individually or in combination. This should be apparent from the energizing circuit for the master relay RY–1, which is from the transducer 35, over the conductors 57, 59, 67, and 68, through the winding of the relay, over the conductor 72, from the anode or plate to the cathode of the electronic release device VT–1, over the conductors 96, 95, common return conductor 82, and conductors 65 and 64 to the transducer 40 and over the conductors 61 and 58, back to the transducer 35. It should be apparent at this point that the signals from the transducer, or transducers, are converted into pulse rate and pulse duration form.

The energization of the master relay RY–1 in the manner above described closes the normally open contacts 73–74. This impresses any pulse or a signal developed by the third transducer 115 in the circuit according to FIGURE 8, across the input terminals 63 and 66 of the computer circuit. The energization of this relay also opens the normally closed contacts 79 and 80.

Upon the cessation of the information signals impressed across the input terminals 63 and 66 of the computer circuit, master relay RY–1 is released and its contacts 79 and 80 are again closed. The re-closing of these contacts again completes the energizing circuit for the slave relay RY–2. This circuit is from the positive terminal of the battery B–5, over the conductor 98 through the "On" and "Off" switch SW–1, over the conductor 121, through the contacts 79 and 80 of the relay RY–1, over the conductor 123 to the winding of the relay RY–2, and over the common return conductor 82 and the conductor 99 to the negative terminal of the battery B–5.

The energization of the slave relay RY–2 closes its contacts 125 and 126. The circuit for the predetermining counter 130 is now complete. This circuit is from the positive terminal of the battery B–5, over the conductor 98, through the "On" and "Off" switch SW–1, and over the conductors 121 and 122 to one input terminal 128 of the predetermining counter; the other side of this circuit is from the second input terminal 129, over the conductor 124 to the normally open contacts 125 and 126 of the slave relay RY–2, and over the conductor 127, the common return conductor 82, and the conductor 99 to the negative terminal of the battery B–5.

In the described circuit, the slave relay RY–2 and the predetermining counter 130 are operated when the master relay RY–1 is released. However, if desired, the conductors 121 and 123 leading to the normally closed contacts 79 and 80 of this relay may be interchanged. This would reverse the operating load of the counter. With the master relay RY–1 open, the slave relay RY–2 and the counter would be operated when the relay RY–1 is closed.

The predetermining counter 130 is arranged to give a readable signal, when any predetermined number of units or pre-set quantity of units have been run through the primary weighing system, comprised in part by the chute 27 and the deflector vane 18. As shown, the output terminals 131 and 132 of the counter are connected by conductors 133 and 134, respectively, to the electro-magnet 16, which operates the slide valve 15 controlling the outlet opening 14 from the conveyor 10. The counter will, therefore, turn off the flow of the material from the conveyor 10 at the correct pre-set unit selected.

In the weight-volume ratio determining apparatus for liquids, as above described, and as illustrated in FIGURE 22, the flap valve 180 functions in an analogous manner to the vane 42 on the shaft 41 of the transducer 40 and the check valve 182 functions in analogous manner to the arm 31 and counterweight 32 on the shaft section 28*a* in the arrangements of FIGURES 1, 5, and 7.

FIGURES 9 to 17, inclusive, show the performance curves of the computer circuit according to the present invention. These graphs are peculiar to the combination chute weigher and computer circuit according to the present invention and clearly show the highly desirable performance curves of this circuit. The graphs delineate the response control segments, which comprise an operational computing circuit. This computer circuit according to the present invention contemplates future responses because of the past history of experience and therefore possesses a mobile memory of controlled retentivity. On each of the graphs in FIGURES 9 and 16, inclusive, there is shown in dotted lines a reference curve. The lower curves (in solid lines) are the release curves for the electronic release device VT–1. The memory in effect travels along these release curves.

The graphs clearly illustrate how the non-linear reference curve can be thoroughly modified in a mathematical fashion to evolve as a curve with linear characteristics. The exact shape of the several release curves is dependent upon the contour of the chute 27, and the inclination of the latter, the shape of the flow restricting elements 50, 52, or 54, if present, the characteristics of the electric release device VT–1, and the particular electronic relationship of the circuit components.

Figure 9:
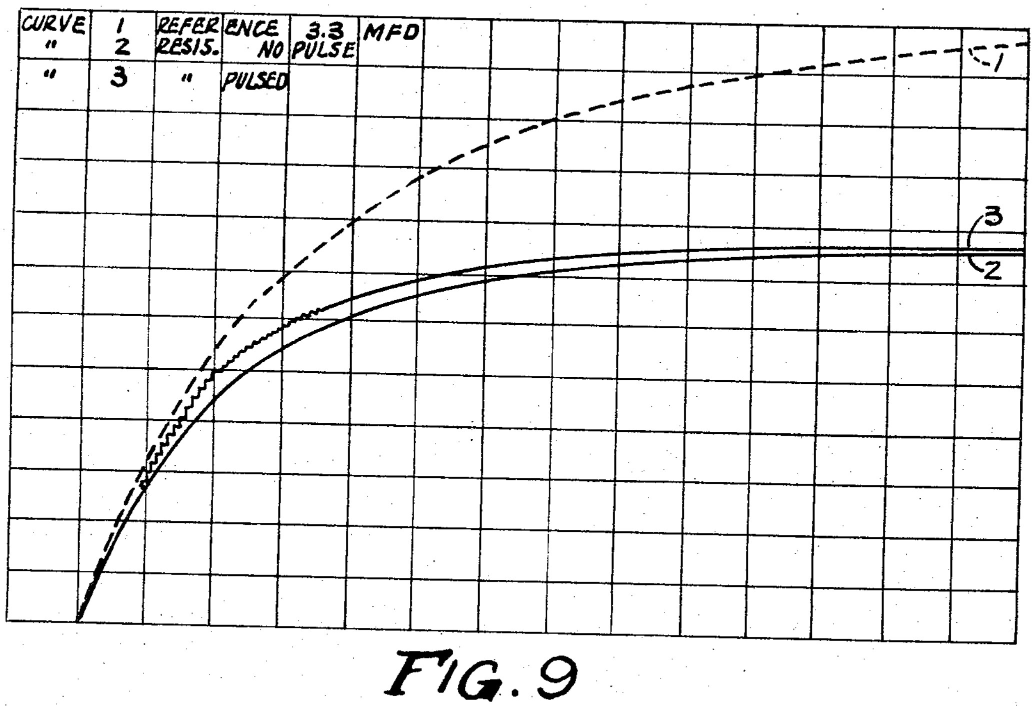
Figure 10:
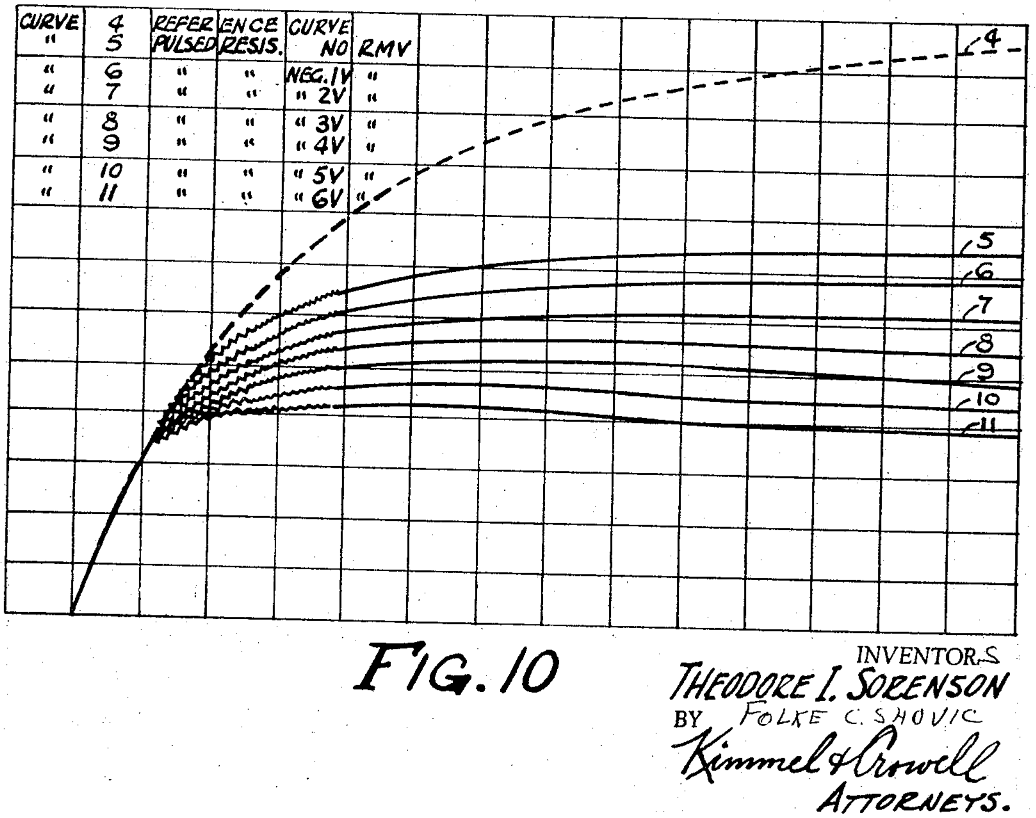
Figure 11:
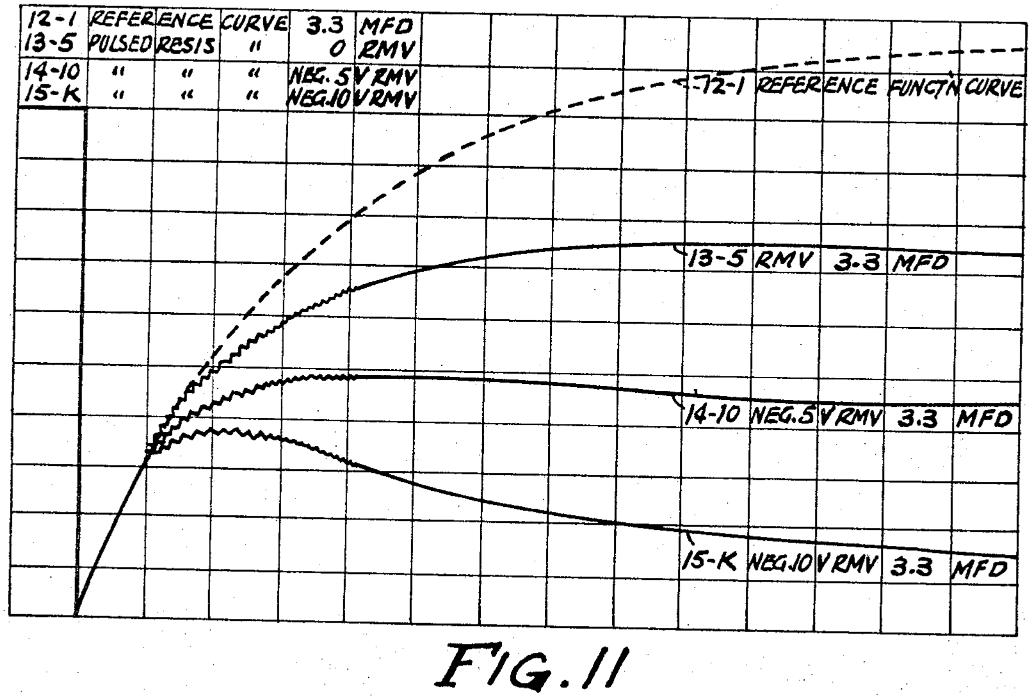
Figure 12:
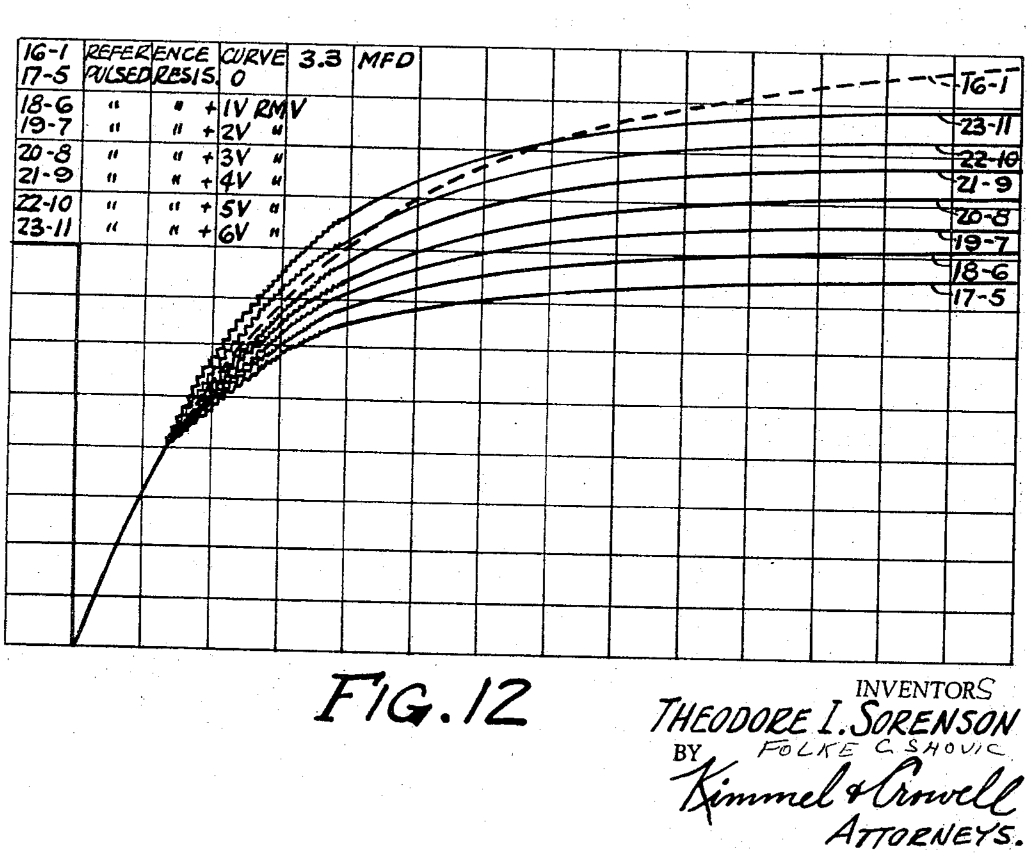
Figure 13:
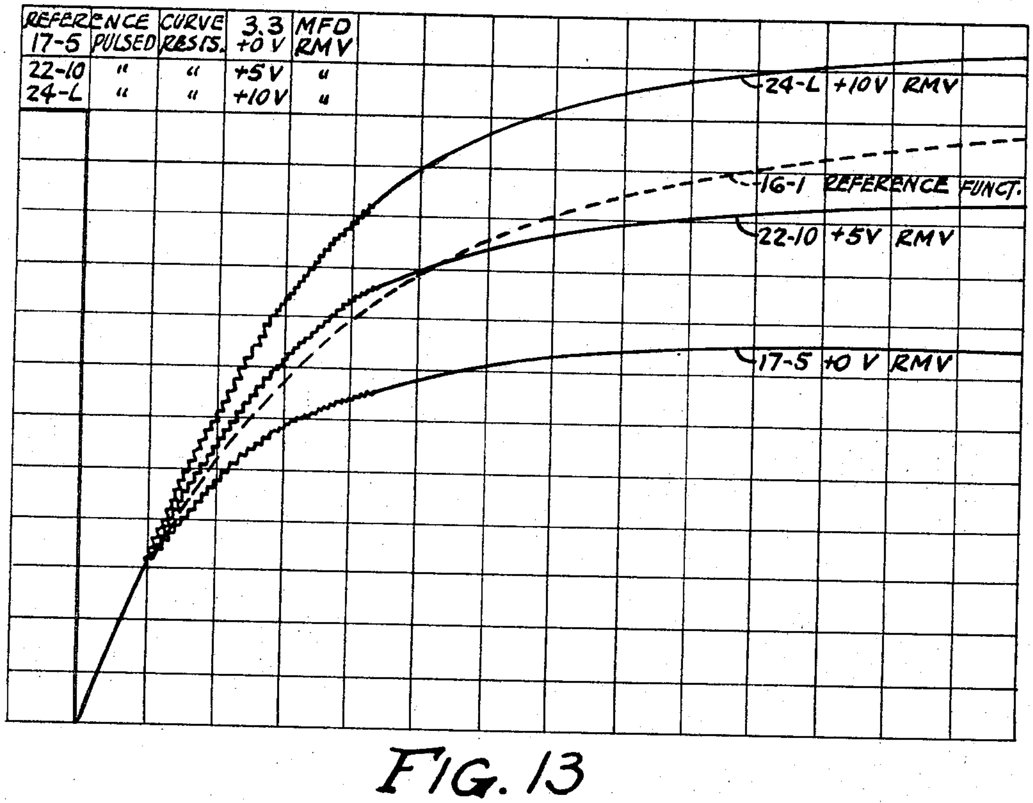
Figure 14:
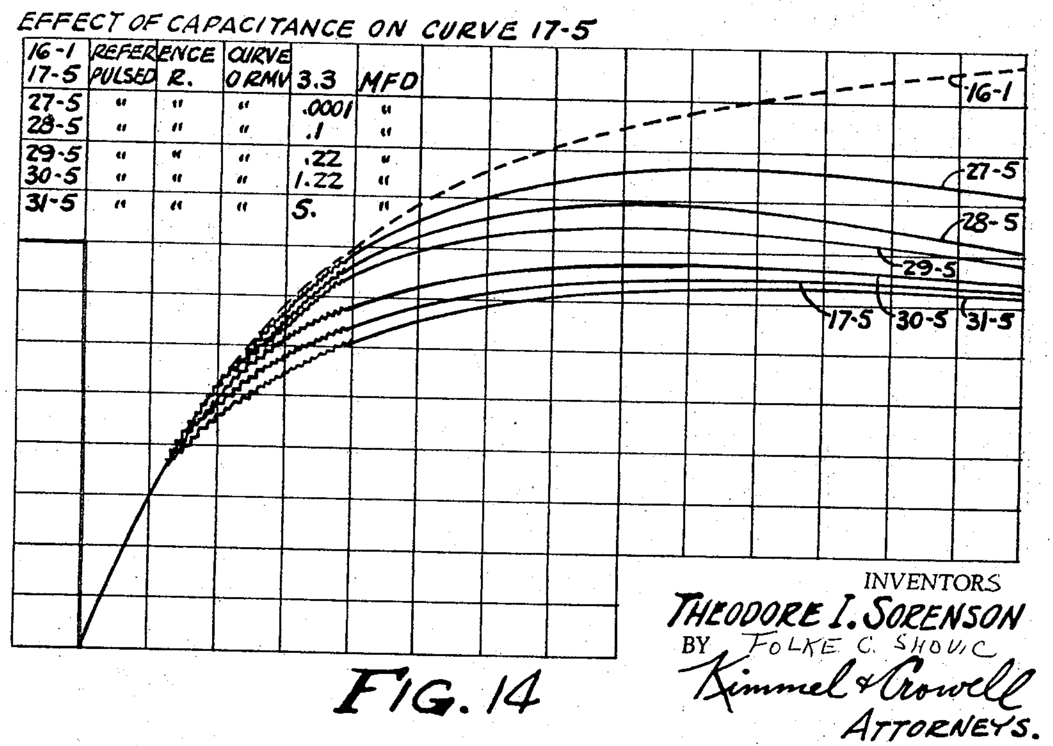

The graph of FIGURE 9 shows the curve 3 (in solid lines) which represents small voltages simulated and injected for demonstration purposes, as compared with the reference curve No. 1 (in dotted lines). With certain degrees of rate changes, the response modifying voltage can be readily moderated from a non-linear to a strict linear progression. This can be readily seen from the graph of FIGURE 10, where the flattened portions of curves 6, 7 and 8 clearly demonstrate this action. This is a very much desired characteristic in computer circuits, which has not been previously understood, and hence not utilized.

Figure 15:
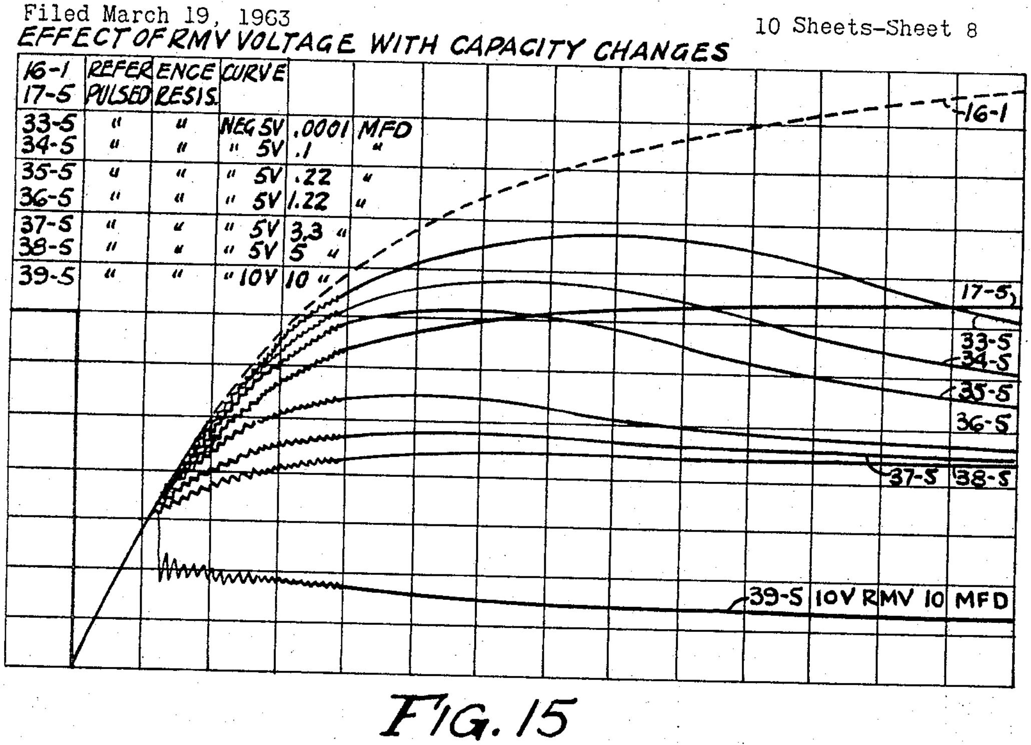

The graph of FIGURE 15 shows a comparison of the performance curves when a smoothing net is used and when such smoothing net is omitted. The curves here show that this new response modifying voltage is brought into clear and sharp focus without the inclusion of such a network in the computer circuit. This circuit according to the present invention has been found to operate very well without the use of any such smoothing network.

Figure 16:
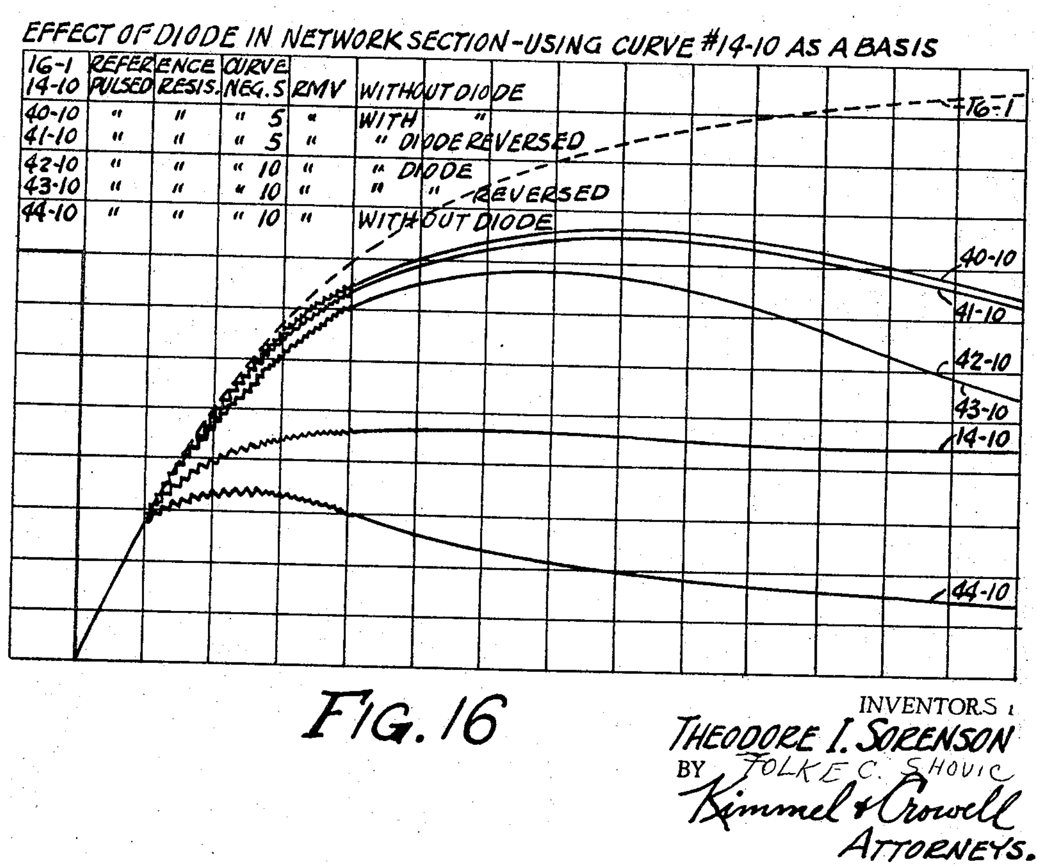

The graph of FIGURE 16 shows the effect of using the diode rectifier D–1 in the network sections. The upper dotted line curve is the reference curve. The lower curves show the performance with different negative response modifying voltages, with the diode rectifier connected in the network as shown, and with same reversed.

Figure 17:
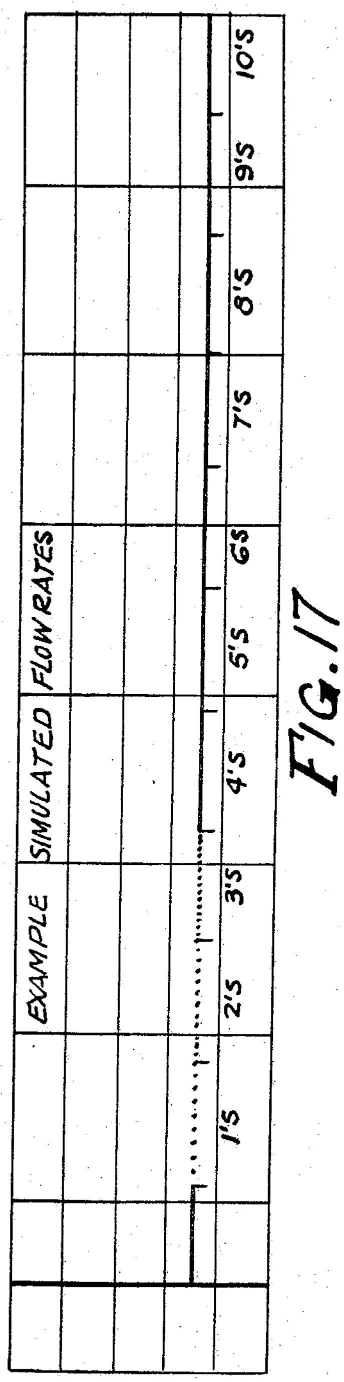

The graph of FIGURE 17 shows simulated flow rates. This graph is based on the graph of FIGURE 15, "Effect of Responsive Modifying Voltages with Capacity Changes." As shown in FIGURE 17, the flow rates commence as spaced dots, the spaces between the dots become progressively smaller, and the dots eventually merge into a continuous line, a stage when the counter cannot resolve them.

One of the outstanding features of the present computer circuit is its ability to readily and simply change the response curves from non-linear to exact linear forms and thus make available an infinite group of rate changes. Another predominant feature of this circuit is its selectivity from the stated grouping by upward or downward travels. As any of these rate changes can be geometrically repeated, the computer circuit is very accurate and precise.

The computer circuit provides a tremendously wide and very useful operating range of flow rate changes. In addition, the circuit embodies extreme simplicity and is very economical in power consumption. In applying the circuit to certain processes to which it may be adapted, it is necessary to bring the controlling response modifying voltage towards the input for controlling the feed flow. In doing so, the required high degree of process control is achieved. The circuit is particularly adaptable to automatic machine control through amplification of the backward section of same.

While the backwards circuit forming the principal component of the present invention has been described and illustrated in conjunction with a weight to volume ratio computer, it will be understood that it is equally well adapted for use as the principal component part of an electronic computer for making other determination.

Having now fully described our invention, what we claim as new and useful and desire to secure by Letters Patent of the United States is:

We claim:

1. An apparatus for determining the quantity of a flowable material comprising an angularly adjustable chute down which the material travels, a transducer having an arm secured to said chute so as to be responsive to variations in its angular position due to material entering same, a computer circuit including an electronic discharge device having a current collecting electrode (anode) and a current emitting electrode (cathode), a relay, a circuit for delivering a response modifying voltage to the electronic release device comprising on one side a conductor from the transducer to one side of the winding of the relay and a conductor from the other side of the winding of the relay to the current collecting electrode of the electronic discharge device, a pulse shaping network for delivering a pulse to the electronic release device including branches with a variable resistor in one branch, a diode rectifier in a second branch, and a fixed resistor and a capacitor in series in another branch, and a circuit for delivering a pulse across the anode and cathode of the electronic release device including a battery, and series connections from the anode of the electronic release device, the pulse shaping network, the battery, the contacts of the relay, and to the cathode of the electronic release device, a source of electro-motive force for the heater of the electronic release device, an output circuit (counter) connected to the computer for producing a read-out signal perceptible to human senses which is indicative of the amount of fluent material which has flowed through the chute.

2. An apparatus for determining the quantity of a flowable material comprising an angularly adjustable chute down which the material travels, a first transducer having an arm secured to said chute so as to be responsive to variations in its angular position due to the material entering same, a second transducer having a shaft extending through the chute with a vane thereon responsive to the flow of the material along the walls and the bottom of the chute, a computer circuit including an electronic discharge device having a current collecting electrode and a current emitting electrode, a relay, a circuit for delivering a response modifying voltage to the electronic release device comprising on one side a conductor from the first transducer to one side of the winding of the relay and a conductor from the other side of the winding of the relay to the current collecting electrode of the electronic release device, and on the other side a conductor from the first transducer to the current emitting electrode of the electronic discharge device, a pulse shaping network for delivering a pulse to the electronic discharge device having three branches with a variable resistor, a diode rectifier, and a fixed resistor and a capacitor in series in the respective branches, a battery and a circuit for delivering a pulse across the current collecting electrode and current emitting electrode of the electronic discharge device including on one side a conductor from the second transducer to one side of the pulse shaping network, a conductor from the other side of the pulse shaping network to one terminal of the battery, a conductor from the other terminal of the battery to one contact of the relay, and a circuit connection from the other contact of the relay to the current emitting electrode of the electronic release device, and on the other side a conductors from the second transducer to the cathode of the electronic release device, a source of electro-motive force for the heater of the electronic discharge device, an output circuit connected to the computer circuit for producing a read-out signal perceptible to human senses which is indicative of the amount of fluent material which has flowed through the chute.

3. An apparatus for determining the quantity of a flowable material comprising an angularly adjustable chute down which the material travels, a transducer having an arm connected to said chute so as to be responsive to variations in its angular position due to the material entering same, a computer circuit including an electronic release device having an anode, a cathode, and a heater, a master relay, an energizing circuit for the master relay including the winding of the relay and the anode and cathode of the electronic release device, circuit connections from the transducer to the anode and cathode of the electronic release device, a source of electro-motive force for the heater of the electronic release device, an output display counter, a slave relay, an energizing circuit for the slave relay including the source of electro-motive force, the contacts of the master relay, and the winding of the slave relay, and an operating circuit for the counter including the source of electro-motive force and the contacts of the slave relay.

4. An apparatus for determining the quantity of a flowable material comprising an angularly adjustable chute down which the material travels, a first transducer having an arm connected to said chute so as to be responsive to its angular position due to material entering same, a computer circuit including an electronic release device having an anode, a cathode, and a heater, circuit connections from the first transducer to the anode and cathode of the electronic release device for applying a response modifying voltage to the latter, a pulse developing circuit including a second transducer connected across the anode and cathode of the electronic release device, a source of electro-motive force for the heater of the electronic release device, a read-out display counter, and an energizing circuit for the counter including the heater and the source of electro-motive force.

5. An apparatus for determining the quantity of a flowable material comprising an angularly adjustable chute down which the material travels, a first transducer having an arm secured to said chute so as to be responsive to variations in its angular position due to the material entering same, a second transducer in series connection with the first transducer and having an arm connected to said chute so as to be responsive to the flow of material down same, a computer circuit, circuit connections from the first and second transducers to the computer circuit for applying a response modifying voltage to the latter, a pulse developing circuit including a third transducer connected across the anode and cathode of the electronic release device, an output circuit connected to the computer circuit for producing a read-out signal perceptible to human senses which is indicative of the amount of fluent material which has flowed through the chute.

6. An apparatus for determining the quantity of a fluent material comprising an angularly adjustable chute down which the material travels, a combining computer circuit, a first transducer having a vane extending into the chute for angular movement responsive to the material flowing through the latter, circuit connections from the first transducer to the computer circuit, a second transducer operatively connected to the chute to be responsive to the angular position of the latter, circuit connections from the second transducer to the computer circuit and an output circuit connected to the computer circuit.

7. An apparatus for determining the quantity of a fluent material comprising an angularly adjustable chute down which the material travels, a combining computer circuit, a first transducer having a vane extending into the chute for angular movement responsive to the material flowing through the latter, circuit connections from the first transducer to the computer circuit, a second transducer positioned along the chute from the first transducer in the direction of the flow of the material through the latter and also having a vane extending into the chute for angular movement responsive to the material flowing through the latter, circuit connections from the second transducer to the computer circuit and an output circuit connected to the computer circuit.

8. An apparatus for determining the quantity of a fluent material comprising a vertically positioned and angularly adjustable chute down which the material falls, a combining computer circuit, a first transducer having a rotatable shaft, a vane on said shaft extending into the chute for angular movement responsive to the material falling through the latter, an arm on said shaft, and an adjustable counter-weight on said arm for biasing the vane to a predetermined position when no material is falling through the chute, circuit connections from the first transducer to the computer circuit, a second transducer positioned along the chute below the first transducer and having a rotatable shaft, a vane on said latter arm also extending into the chute for angular movement responsive to the material falling from the vane of the first transducer onto same, an arm on the latter shaft, and dual adjustable counterweights on the latter arm for biasing the vane of the second transducer to a stationary position for a predetermined volume of material falling through the chute, circuit connections from the second transducer to the computer circuit and an output circuit connected to the computer circuit.

9. An apparatus for determining the quantity of a fluent material comprising a vertically positioned and angularly adjustable chute down which the material falls, a combining computer circuit, a first transducer having a vane extending into the chute for angular movement responsive to part of the material falling through the chute, circuit connections from the first transducer to the computer circuit, a deflector vane pivotally mounted within the chute above the vane of the first transducer for angular movement responsive to the remainder of the material falling through the chute and reverting the latter part of the material onto the vane of the first transducer, linkage connecting the deflector vane to the chute so that a given angular movement of the latter results in a corresponding angular movement of the former, a second transducer positioned along the chute below the first transducer having a vane extending into the chute for angular movement responsive to the material falling from the vane of the first transducer onto same, circuit connections from the second transducer to the computer circuit and an output circuit connected to the computer circuit.

10. An apparatus for determining the quantity of liquids comprising a conduit through which the liquids flow, a first valve within the conduit responsive to the flow of the liquid through the latter, a transducer having an arm connected to the valve so as to be responsive to the movements of the latter, a combining computer circuit, circuit connections from the transducer to the computer circuit, a second valve positioned in the conduit for controlling the flow of the liquid through same and an output circuit connected to the computer circuit.

11. An apparatus for determining the quantity of flowing fluent material, comprising:

an angularly variable chute for receiving fluent material, said chute being mounted for angularly variable motion as a function of the quantity of fluent material flowing therein;

a transducer connected to the chute for deriving an analog electronic signal as a function of the angular disposition of the chute, said signal thereby being a function of the amount of fluent material flowing therein;

a computer circuit for generating pulses at a rate dependent on the magnitude of an input signal, said computer circuit comprising, an electron discharge device having a current collecting electrode (anode), and a current emitting electrode (cathode);

circuit means for feeding an input signal from the transducer to the current collecting electrode at one point and to the current emitting electrode at a second point; and an output circuit (counter) connected to the computer circuit for producing read-out signal perceptible to human senses which is indicative of the amount of fluent material flowing in the chute.

12. The apparatus of claim 11 further comprising:

a conveyor for delivering fluent material to the chute from a point above the chute;

a pivoted deflector vane positioned between the conveyor and the chute for receiving the fluent material from the conveyor and delivering said material to the chute; and linkage interconnecting the deflector vane and the chute for angularly positioning the deflector vane according to the position of the chute.

13. The apparatus of claim 11 further comprising:

a flow restricting element secured in the chute.

14. The apparatus of claim 11 further comprising:

a valve for controlling the admission of fluent material to the chute; and valve operating means connected for actuation by the output signal of the computer circuit for controlling the rate of delivery of fluent material to the chute.

15. The apparatus of claim 11 further comprising:

a second transducer connected to the chute for deriving an analog electronic signal as a function of the volume of fluent material flowing in the chute;

and wherein:

circuit means for feeding an input signal to the computer circuit feeds a signal which is functionally related to the output signals of both the transducers.

16. The apparatus of claim 15 comprising:

a conveyor for delivering fluent material to the chute from a point above the chute;

a pivoted deflector vane positioned between the conveyor and the chute for receiving the fluent material from the conveyor and delivering said material to the chute; and linkage interconnecting the deflector vane and the chute for angularly positioning the deflector vane according to the position of the chute.

17. The apparatus of claim 15 further comprising:

a flow restricting element secured in the chute.

18. In an apparatus for determining the rate of flow of fluent material and for totalizing the quantity of fluent material which flows past a predetermined point, the improvement which comprises:

angularly variable flow directing means for supporting and directing a stream of flowing fluent material;

means mounting the flow directing means for variable angular movement, said angular movement being functionally related to the weight of fluent material flowing in said flow directing means at any given time;

a first transducer operatively connected to the flow directing means for deriving an electronic analog signal which is functionally related to the weight of fluent material flowing in the flow directing means at said given time;

a computer circuit connected for receiving the transducer output signal for converting said output electronic analog signal into a digital signal (pulses) which is substantially linearly functionally related to the weight of fluent material flowing in the flow directing means at said given time; and read-out means connected for receiving said digital signal for totalizing a plurality of said digital signal and giving an indication which is indicative of the total weight of fluent material which has flowed in said flow directing means since said apparatus was actuated.

19. The apparatus of claim 18 further comprising:

at least one additional means for measuring an additional physical quantity which is functionally related to the rate of flow of fluent material in said flow directing means, said additional means for measuring an additional physical quantity including an additional transducer for deriving a second electronic analog signal which is functionally related to said additional physical quantity; and circuit means interconnecting the transducers and the computer circuit for feeding a combination signal which is functionally related to the weight and said additional physical quantity to said computer.

20. The apparatus of claim 18 wherein:

the computer circuit includes an electron discharge device having a current collecting electrode; and circuit means for feeding the input signal to the computer to said current collecting electrode.

21. The apparatus of claim 19 further including:

switching means in the circuit means for feeding the input signal to the computer, said switching means constructed to derive a digital signal when the input signal reaches a predetermined value.

References Cited

UNITED STATES PATENTS

| | | | |
|---|---|---|---|
| 2,371,040 | 3/1945 | Fisher et al. | 177—16 |

FOREIGN PATENTS

| | | |
|---|---|---|
| 66,608 | 3/1948 | Denmark. |
| 943,330 | 12/1963 | Great Britain. |

ROBERT B. REEVES, *Primary Examiner.*

HADD S. LANE, *Examiner.*